US007831973B2

(12) United States Patent
Amano et al.

(10) Patent No.: US 7,831,973 B2
(45) Date of Patent: Nov. 9, 2010

(54) TASK SCHEDULING APPARATUS, TASK SCHEDULING METHOD, TASK SCHEDULING PROGRAM, STORAGE MEDIUM AND TRANSMISSION MEDIUM

(75) Inventors: Katsushige Amano, Kyoto (JP); Masashige Mizuyama, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1113 days.

(21) Appl. No.: 10/563,436

(22) PCT Filed: Dec. 24, 2004

(86) PCT No.: PCT/JP2004/019737

§ 371 (c)(1),
(2), (4) Date: Jan. 5, 2006

(87) PCT Pub. No.: WO2005/064463

PCT Pub. Date: Jul. 14, 2005

(65) Prior Publication Data

US 2006/0161922 A1    Jul. 20, 2006

(30) Foreign Application Priority Data

Dec. 26, 2003  (JP)  ............................. 2003-433106

(51) Int. Cl.
  *G06F 9/46*  (2006.01)
(52) U.S. Cl. .................................................... 718/103
(58) Field of Classification Search .......... 718/102–103
  See application file for complete search history.

(56) References Cited

U.S. PATENT DOCUMENTS

| 5,465,335 | A  | * | 11/1995 | Anderson ..................... 718/107 |
| 5,944,778 | A  | * | 8/1999  | Takeuchi et al. ............. 718/100 |
| 6,662,203 | B1 | * | 12/2003 | Kling et al. .................. 718/103 |
| 2003/0061423 | A1 | * | 3/2003 | Rankin et al. ................ 710/260 |
| 2004/0025160 | A1 | * | 2/2004 | Dice et al. ................... 718/102 |

FOREIGN PATENT DOCUMENTS

| EP | 0 798 638   | 10/1997 |
| EP | 0 817 018   | 1/1998  |
| JP | 04-335441   | 11/1992 |
| JP | 06-035854   | 2/1994  |
| WO | 00/63776    | 10/2000 |

* cited by examiner

*Primary Examiner*—Li B Zhen
*Assistant Examiner*—Blake Kumabe
(74) *Attorney, Agent, or Firm*—Wenderoth, Lind & Ponack, L.L.P.

(57) ABSTRACT

Each task #1, #2 registers signal handlers belonging thereto in a signal-handler table through a handler registering section in an OS, and registers itself and the priority thereof in a task/handler priority table through a task registering section. When a signal is generated, a signal notifying section specifies a signal handler corresponding to the signal and the priority thereof by referring to the signal-handler table, and a task/handler selecting section selects a task or signal handler having a highest priority in the task/handler priority table. A task executing section executes the selected task and a signal-handler executing section executes the selected signal handler.

9 Claims, 13 Drawing Sheets

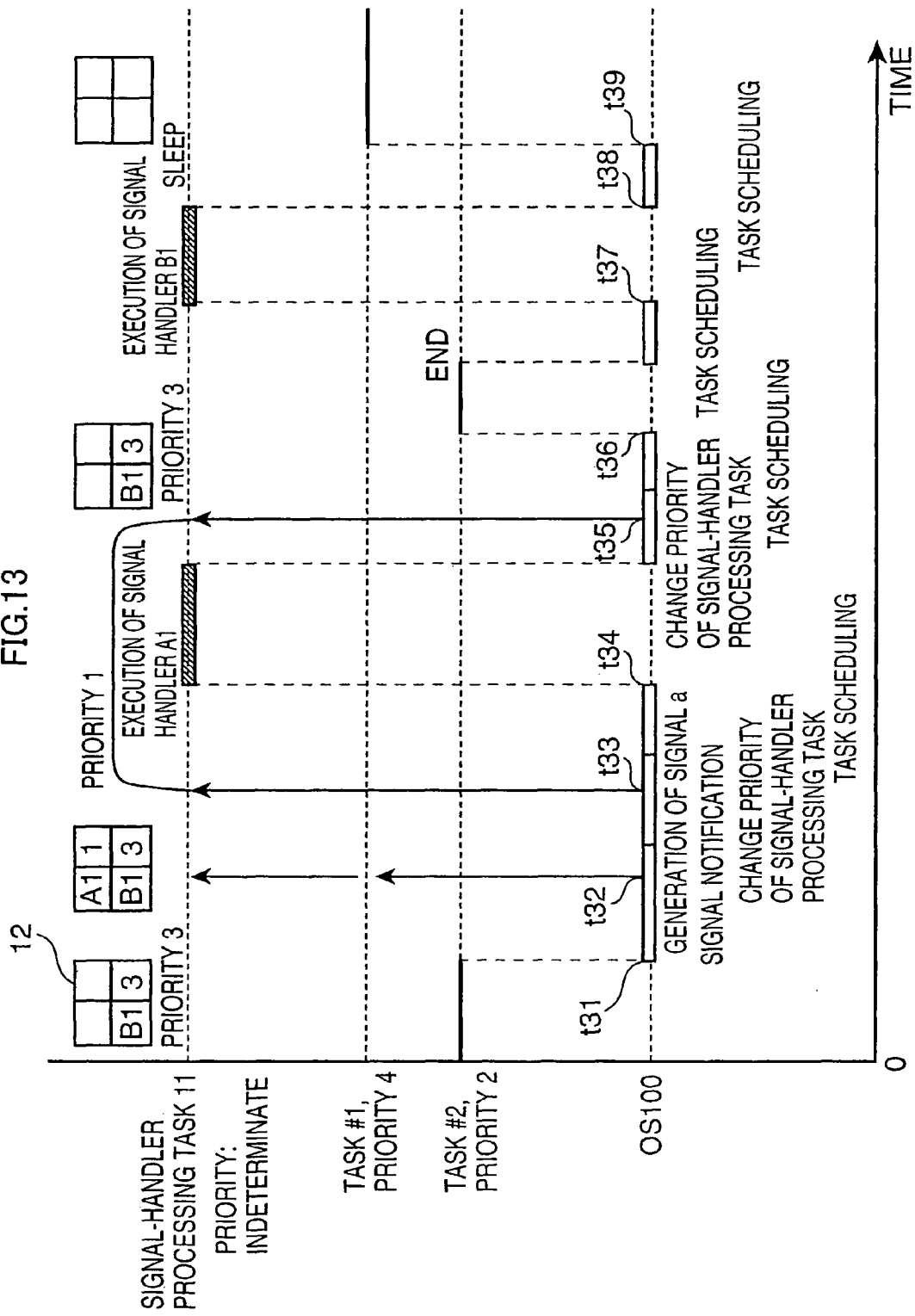

TASK SCHEDULING APPARATUS, TASK SCHEDULING METHOD, TASK SCHEDULING PROGRAM, STORAGE MEDIUM AND TRANSMISSION MEDIUM

TECHICAL FIELD

The present invention relates to a task scheduling apparatus, a method, a program, a storage medium and a transmission medium for carrying out task scheduling in a multi-task environment.

BACKGROUND ART

In a computing apparatus for executing a task scheduling processing, signals are known as a technique for making a certain notification to a task from an operating system (OS). A signal is prepared for each event so as to notify an occurrence of a specific event to a specific task. The signal notification can be realized by software, for example, by changing a certain variable in a program. Some OSs provide such a scheme as to enable the registration of processings to be done by the task upon receiving a signal. This processing corresponding to the signal reception is often called a signal handler.

A general scheme of a signal and a signal handler is specifically described. First, a certain task #1 registers a signal handler A in response to a signal "a" and a signal handler B in response to a signal "b", i.e. registers a signal handler for each kind of the signal. Thereafter, upon the notification of the signal "a" to the task #1 from the OS, the signal handler A is executed after interrupting the execution of the usual task #1. Likewise, upon the notification of the signal "b", the signal handler B is executed. The generation of a signal corresponds to a certain event, e.g. the input of a command by a user, as described above, and a processing corresponding to the event can be defined (registered) as a signal handler for each individual task.

Further, some OSs provide such a scheme as to notify a specific signal at a time set by a task. In such OSs, the scheme of the signals can be utilized for a task to execute a processing in accordance with an actual time. In other words, a signal is sent from the OS to a task at a time when a required processing should be executed in the form of a signal handler. In this case, the precision of the processing to the actual time is required, and the signal handler needs to be executed immediately after the signal notification.

Generally, it is frequently required to immediately execute a specified processing in response to an occurrence of a certain event, and inventions made therefor are also known. For example, Japanese Unexamined Patent Publication No. H04-335441 (patent document 1) discloses a method for improving the immediacy of a command by setting the priority of a process corresponding to a command given from a specific user, terminal or the like at a high fixed value.

Normally, the signal handler is frequently executed by the context of the task. Specifically, the task is scheduled based on its priority and the signal handler corresponding to the notified signal is executed for the first time when the task is executed. Thus, there is a high possibility of executing a signal handler of a task having a lower priority at a delay from the signal notification according to the known technology, wherefore no processing immediately responsive to the signal notification can be executed. In order to avoid this problem, it is necessary to set the priority of the task at a sufficiently high value. As a result, tasks whose signal handlers are required to have readiness have higher priorities and the execution thereof is prioritized over processes having lower priorities even in cases other than the execution of the signal handlers.

However, the tasks whose signal handlers are required to have readiness are not necessarily required to be preferentially executed even in other processings. There are cases of desiring a design to prioritize other tasks for processings other than the execution of signal handlers. Accordingly, a freedom in designing priorities of tasks may be hindered by setting high priorities for tasks whose signal handlers are required to have readiness. This has been a problem in using the signal handlers.

DISCLOSURE OF THE INVENTION

In view of the above problems, an object of the present invention is to provide a task scheduling technology that does not hinder a freedom in designing the priorities of tasks while ensuring the readiness of signal handlers in response to a signal.

In order to solve the above problems, one aspect of the present invention is directed to a task scheduling apparatus for parallelly processing a plurality of tasks assigned with priorities and including one or more tasks each having one or more signal handlers assigned with priorities, comprising: a signal-handler registering section for registering the respective signal handlers of the one or more tasks, signals corresponding to the respective signal handlers and the priorities of the respective signal handlers while relating them to each other; a signal generating section for generating a signal; and a selection executing section for specifying an object signal handler as a signal handler corresponding to the generated signal and a priority thereof by referring to contents registered by the signal-handler registering section, and executing the one having a highest priority out of the plurality of tasks and the object signal handler.

With this construction, the signal handlers are executed at the priorities independent of the tasks they themselves belong to, and the signal handlers having high priorities are executed with the readiness upon the generation of a signal.

The object, features, aspects and advantages of the present invention become apparent by the following detailed description and the accompanying drawings.

BRIEF DESCRIPTION OF THE DRAWINGS

FIG. 13 is a timing chart showing one example of processings by the apparatus of FIG. 10.

BEST MODE FOR CARRYING OUT THE INVENTION

Hereinafter, embodiments of the present invention are described with reference to the accompanying drawings.

First Embodiment

Figure 1:
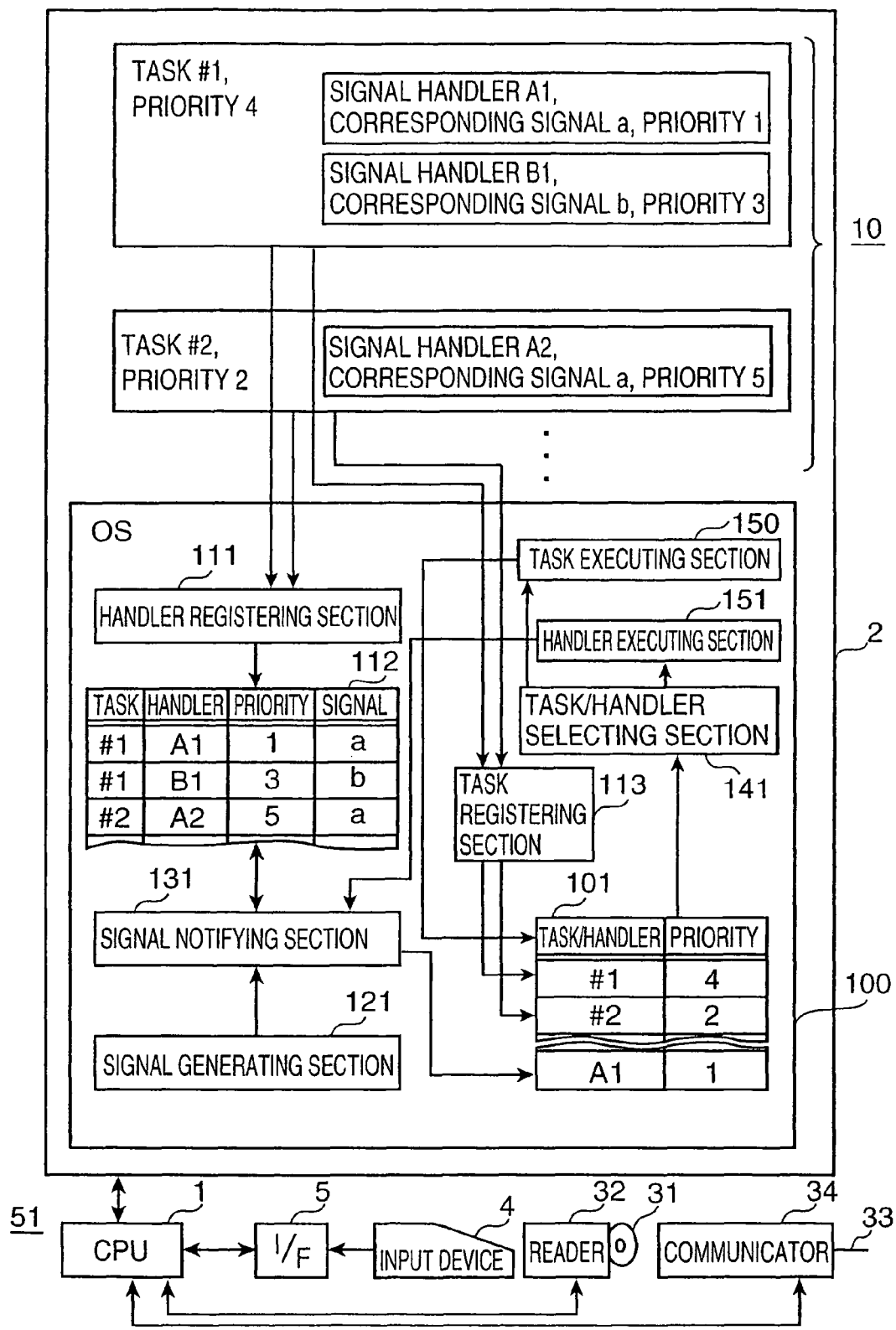
FIG. 1 is a block diagram showing a construction of a task scheduling apparatus according to a first embodiment of the invention.

FIG. 1 is a block diagram showing a construction of a task scheduling apparatus according to a first embodiment of the invention. This task scheduling apparatus 51 constructs a part of a computing apparatus (computer). The computing apparatus is provided with at least one central processing unit (CPU) 1 and a memory device 2. The computing apparatus may be additionally provided with an input device, an output device and other devices. In an example of FIG. 1, the computing apparatus is further provided with an input device 4 and an input interface 5. The input device 4 is, for example, a keyboard or operation buttons in the case that the computing apparatus is applied to a mobile phone.

The CPU 1 used is of any arbitrary type provided that it has a sufficient processing ability. A program including one or more tasks and an operating system (OS) 100 of the computing apparatus, and data are stored in the memory device 2. Individual tasks #1, #2 included in the task 10 may be one program or one process or one thread as a part of a program. A memory of any arbitrary type such as a random access memory (RAM) or a flash memory may be used as the memory device 2 provided that it has sufficient function and capacity. It is not necessary to construct the memory device 2 by a single memory device, and the memory device 2 may be a combination of a plurality of memory devices of the same kind or a combination of a plurality of memory devices of different kinds including a read only memory (ROM). In addition to the memory device 2, the computing apparatus may be provided with an external storage device such as a hard disk and the program and the data may be transferred to the external storage device as long as it does not cause any problem in the operation of the computing apparatus.

The program and the data can be supplied via a storage medium 31 such as a ROM, a flexible disk or a CD-ROM or via a transmission medium 33 such as a telephone circuit or a network. This also holds for other embodiments. A CD-ROM is shown as the storage medium 31 and a telephone circuit is shown as the transmission medium 33 in FIG. 1. The program and the data stored in the CD-ROM can be read, for example, by connecting a CD-ROM reader 32 as an external device of the computing apparatus with a computing apparatus main body and can be stored, for example, in a RAM or an unillustrated hard disk. In the case of supplying the program and the data from a ROM as the storage medium 31, this ROM is loaded into the computing apparatus to enable the computing apparatus to execute a processing in accordance with the program and the data. In such a case, the ROM is included in the memory device 2. The program and the data supplied via the transmission medium 33 are received by a communicator 34 and saved, for example, in a RAM or an unillustrated hard disk. The transmission medium 33 is not limited to a wire transmission medium, but may be a wireless transmission medium. Further, the transmission medium 33 includes not only communication lines, but also a relay for relaying the communication lines, a communication link such as a router.

The respective tasks #1, #2, ... included in the task 10 have priorities similar to those administered in an ordinary computing apparatus of the multi-task type and are parallelly processed in a time-sharing manner in an order according to their priorities. In FIG. 1, the respective tasks are expressed by #1, #2, ..., #N (N is a natural number).

The respective tasks #1, #2, ..., #N register signal handlers corresponding to signals of one or more kinds in a signal-handler registering section 111 (written as a "handler registering section" in FIG. 1 and succeeding figures) of the OS 100 to be described later while designating the priorities to them. FIG. 1 shows a case where the task #1 having a priority "4" registers a signal handler A1 having a priority "1" in correspondence with a signal "a" and registers a signal handler B1 having a priority "3" in correspondence with a signal "b". Likewise, the task #2 having a priority "2" registers a signal handler A2 having a priority "5" in correspondence with the signal "a". Here, the smaller the numerical values representing the priorities, the higher the priorities. That is to say, the priority "1" is meant to be highest. However, the relationship is not generally restricted to this. In the present invention, the priorities can be expressed in any arbitrary form as long as they are distinguishable. This holds not only for the example of FIG. 1, but also for examples shown in all the other figures.

The OS 100 is provided as main elements with the signal-handler registering section 111, a signal notifying section 131, a signal generating section 121, a task/handler selecting section 141, a signal-handler executing section (written as "handler executing section" in FIG. 1 and succeeding figures) 151 and a task executing section 150 in order to realize the task scheduling apparatus 51 in cooperation with the CPU 1.

The signal-handler registering section 111 registers a signal handler corresponding to an arbitrary signal in the OS 100 in response to a request from the task. Further, an arbitrary priority is set for the signal handler to be registered in response to the request from the task. In other words, the signal handler is registered in the OS 100 while having the task to which it belongs, the corresponding signal and the priority unique thereto as attributes.

Figure 2:
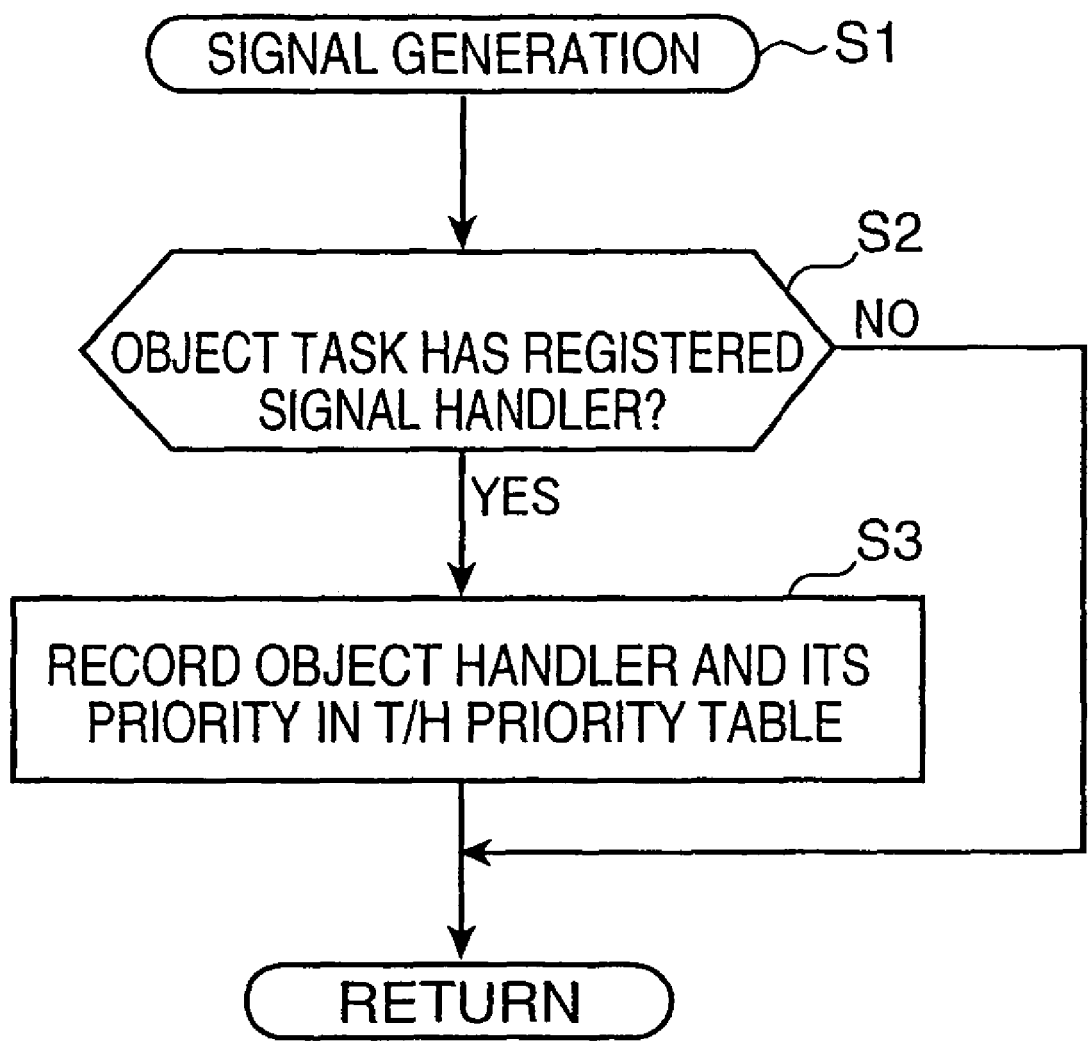
FIG. 2 is a flow chart showing the flow of processings by the apparatus of FIG. 1.

In order to easily realize the registration, the OS 100 includes a signal-handler table (written as "handler table" in FIG. 2 and succeeding figures). The signal-handler registering section 111 registers the task, the handler, the priority and the signal in the signal-handler table 112 while relating them to each other.

After being written in the memory device 2, each task can register the signal handler of its own in the signal-handler table 112 by sending a request to the signal-handler registering section 111 at a timing when the signal handler thereof should be made executable. Each task also can erase the signal handler of its own from the signal-handler table 112 by sending a request to the signal-handler registering section 111 at a timing when the executable state of the signal handler thereof should be canceled. Further, each task can change the priority of the registered signal handler by sending a request to the signal-handler registering section 111 when the time comes when the priority of the registered signal handler should be changed. In other words, each task can register the signal handler of its own when being written in the memory device 2 and, thereafter, can suitably register, change and erase if necessary.

The handler registering section 111 can be constructed as a system call. In such a case, the task #1, for example, calls the handler registering section 111 as a system call and transfers a mark specifying the task (tentatively called "task mark") "#1", a mark specifying the signal handler (tentatively called "handler mark") "A1", a mark specifying the priority and the signal (tentatively called "signal mark") "a" and other contents to be recorded to the handler registering section 111 as arguments. The handler registering section 111 registers the transferred contents in the signal-handler table 112. Further, when the task #1 calls the handler registering section 111 and transfers a new priority value as a priority as an argument in addition to the task mark "#1", the handler mark "A1", the signal mark "a", the handler registering section 111 changes the corresponding priority in the signal-handler table 112 to the new value in accordance with the transferred contents. Further, when the task #1 calls the handler registering section 111 and transfers a specific value as a priority, for example, "0" as an argument in addition to the task mark "#1", the handler mark "A1", the signal mark "a", the handler registering section 111 erases contents in tuples (rows) corresponding to the task mark "#1", the handler mark "A1" and the like in the signal-handler table 112.

The signal generating section 121 generates a signal in accordance with an event. Correspondence between events and signals is determined by the design of the OS 100. For example, a signal "a" is generated in accordance with the input of a specific command by a user through the operation of the input device 4, and a signal "b" is generated in response to an occurrence of an interrupt from a specific device. In this way, the design can be freely made at need. The signal generating section 121 generates information designating the task corresponding to the signal simultaneously with the generation of the signal. For example, when the signal handler A1 should be executed, the signal generating section 121 designates the task #1 and generates the signal "a". The designated task is called an "object task" below. The signal generating section 121 generates the signal and notifies the signal together with the information designating the task #1 to the signal notifying section 131.

The signal notifying section 131 adds the signal handler corresponding to the signal generated by the signal generating section 121 to objects to be selected by the task/handler selecting section 141. The task/handler selecting section 141 compares the priorities of all the tasks in the executable state and those of the signal handlers corresponding to the signal notified by the signal notifying section 131 and selects the one having a highest priority. In the case of selecting the task, the task/handler selecting section 141 calls the task executing section 150. The called task executing section 150 executes the selected task. In the case of selecting the signal handler, the task/handler selecting section 141 calls the signal-handler executing section 151. At this time, the task/handler selecting section 141 notifies the selected signal handler to the signal-handler executing section 151. The called signal-handler executing section 151 executes the selected signal handler.

In order to make it easier for the task/handler selecting section 141 to select the one having a highest priority out of all the tasks in the executable state and those of the signal handlers corresponding to the signal, the OS 100 has a task/handler priority table 101. The task/handler priority table 101 is a table in which the tasks in the executable state and the priorities thereof are recorded while being related to each other and the signal handlers of the notified signals and the priorities thereof are recorded while being related to each other. Accordingly, contents recorded in the task/handler priority table 101 include task marks, handler marks and the priorities thereof. The task/handler selecting section 141 selects the task or the signal handler having the highest priority out of those recorded in the task/handler priority table 101 at the time of reference by referring to the task/handler priority table 101.

Out of the contents recorded in the task/handler priority table 101, a task-related content is recorded when a new task is written in the memory device 2 or until this new task should be executed for the first time after being written in the memory device by the new task sending a recording request to the OS 100. For example, when the tasks #1, #2 are written in the memory device 2, contents relating thereto are recorded in the task/handler priority table 101. Thereafter, when a new task #3 is written in the memory device 2, a content relating to the task #3 is recorded in the task/handler priority table 101.

The OS 100 has a task registering section 113 in order to record the contents relating to the task 10 in the task/handler priority table 101. Each task of the task 10 can record the content thereof in the task/handler priority table 101 by sending a request to the task registering section 113. Similar to the handler registering section 111, the task registering section 113 can be constructed as a system call. In such a case, for example, when the task #1 calls the task registering section 113 as a system call and transfers the task mark "#1", the priority "4". and other contents to be recorded as arguments to the task registering section 113, the task registering section 113 records the. transferred contents in the task/handler priority table 101. Each task of the task 10 can change the priority of its own registered in the task/handler priority table 101 through the task registering section 113.

The task executing section 150 deletes the content relating to the task whose execution was completed from the task/handler priority table 101 when the execution of the selected task is completed.

Out of the contents recorded in the task/handler priority table 101, those relating to the signal handlers are recorded by the signal notifying section 131. The signal notifying section 131 refers to the signal-handler table 112 when the signal generating section 121 generates a signal, and records a handler corresponding to the signal in the signal-handler table 112 (referred to as "object handler") and the priority thereof in the task/handler priority table 101. For example, when the signal generating section 121 designates the task #1 and generates the signal "a", the signal notifying section 131 records the identification mark "A1" of the object handler corresponding to the task #1 and the signal "a" and the priority "1" thereof are. recorded in the task/handler priority table 101 while related them to each other by referring to the signal-handler table 112.

When the execution of a certain signal handler is completed, the signal-handler executing section 151 notifies the signal handler whose execution was completed to the signal notifying section 131. Upon receiving the notification, the signal notifying section 131 deletes the content corresponding to the signal handler whose execution was completed from the task/handler priority table 101.

Figure 3:
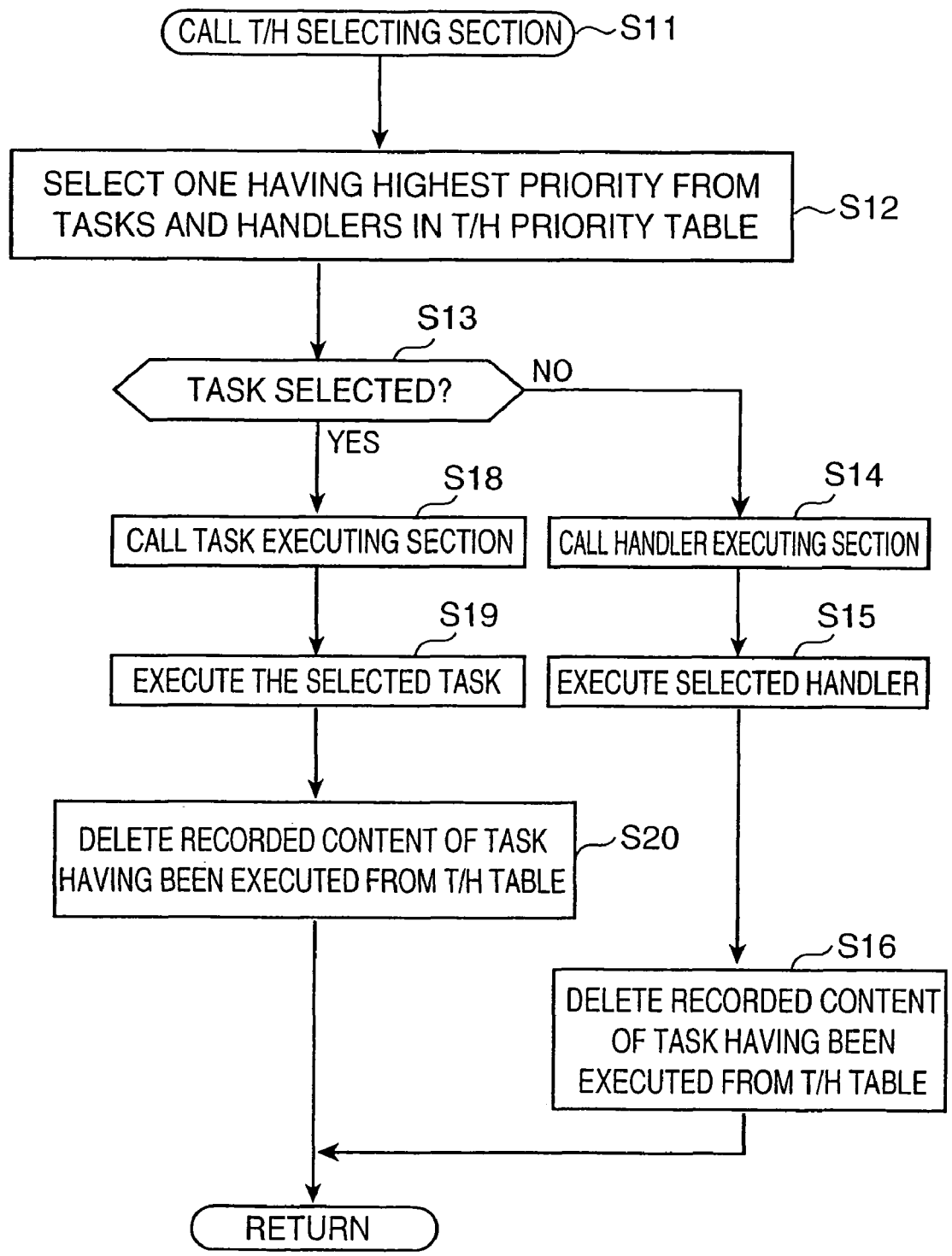
FIG. 3 is a flow chart showing the flow of processings by the apparatus of FIG. 1.

FIGS. 2 and 3 are flow charts showing the flows of processings by the task scheduling apparatus 51 of this embodiment. Before the processings of FIGS. 2 and 3 are executed, one or more signal handlers are registered in the signal-handler table 112 and one or more tasks are registered in the task/handler priority table 101 as illustrated in FIG. 1.

FIG. 2 shows the flow of processings executed upon the generation of a signal. Upon an occurrence of an event such as the input of a specific command by a user through the operation of the input device 4, the processing of Step S1 is executed. In Step S1, the signal generating section 121 generates a signal and notifies it to the signal notifying section 131.

In Step S2, the signal notifying section 131 judges whether or not an object task corresponding to the generated signal has had the signal handler registered by referring to the signal-handler table 112. If the object task has had the signal handler registered (YES in Step S2), the signal notifying section 131 records the object handler and the priority thereof in the task/handler priority table 101 in Step S3. Upon the completion of Step S4, the entire processing flow of FIG. 2 is ended. If the object task is judged not to have had the signal handler registered in Step S2 (NO in Step S2), the entire processing flow of FIG. 2 is ended. Following the end of the processing flow of FIG. 2 (RETURN in FIG. 2), the OS 100 may call the task/handler selecting section 141. In such a case, the processing in Step S11 of FIG. 3 is immediately started.

FIG. 3 shows the flow of processings executed upon calling the task/handler selecting section 141. In Step S11, the task/handler selecting section 141 is called. The task/handler selecting section 141 is called by the OS 100 at a timing similar to a known task scheduling. For example, every time an internal data is changed as the OS 100 executes the processing, the task/handler selecting section 141 is called by the OS 100. Alternatively, an unillustrated timer circuit is connected with the CPU 1, an interrupt is made to the CPU 1, for example, at specified periods by the timer circuit, and the task/handler selecting section 141 is called every time the interrupt is made. Further alternatively, the task/handler selecting section 141 may be called by returning to Step S11 upon the end of the processings of FIG. 2 as described above.

In following Step S12, the task/handler selecting section 141 selects the task or signal handler having a highest priority out of the tasks and, if any, the signal handlers recorded in the task/handler priority. table 101. In Step S13, the task/handler selecting section 141 judges whether or not the task has been selected. If the task has been selected (YES in Step S13), the task/handler selecting section 141 calls the task executing section 150 in Step S18. In Step S19, the task executing section 150 executes the selected task. In Step S20, the task executing section 150 deletes the recorded content relating to the task whose execution was completed from the task/handler priority table 101. The entire processing flow of FIG. 3 is ended upon the completion of the-processing in Step S20.

If the signal handler is judged to have been selected (NO in Step S13), the task/handler selecting section 141 calls the signal-handler executing section 151 in Step S14. In Step S15, the signal-handler executing section 151 executes the selected signal handler. Upon the completion of the processing in Step S15, i.e. the execution of the selected signal handler, the signal-handler executing section 151 notifies the completion of the execution of the signal handler to the signal notifying section 131 in Step S16. Then, the signal notifying section 131 deletes the content corresponding to the notified signal handler from the task/handler priority table 101. Upon the completion of the processing of Step S16, the entire processing flow of FIG. 13 is ended. As described above, upon the end of the entire processing flow of FIG. 3, the task/handler selecting section 141 may be immediately called by returning to Step S11.

Figure 4:
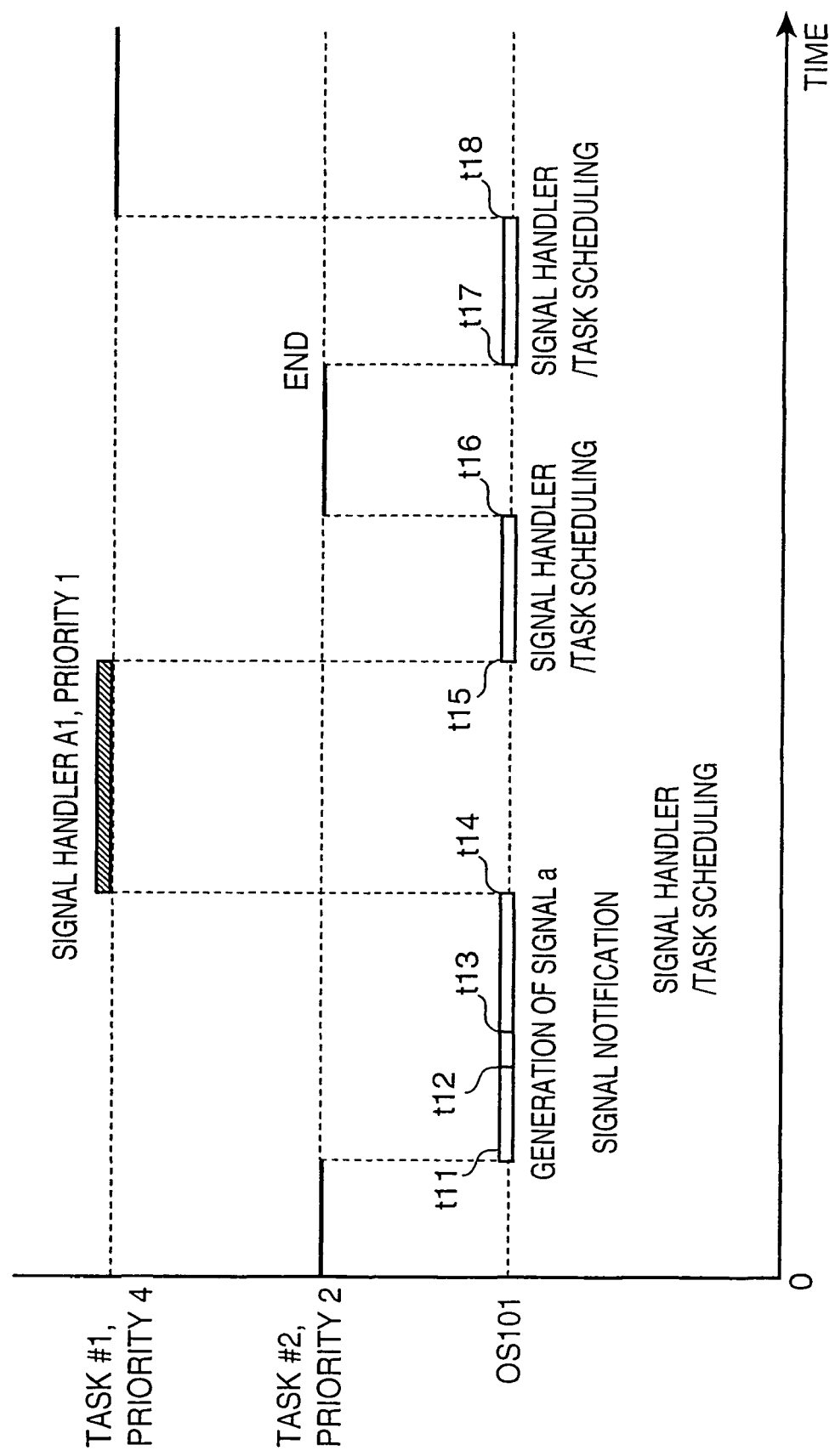
FIG. 4 is a timing chart showing one example of processings by the apparatus of FIG. 1.

FIG. 4 is a timing chart showing one example of processings according to this embodiment. In the example of FIG. 4, it is assumed that two tasks #1, #2 exist in the memory device 2 as the task 10. It is also assumed that the contents of the signal-handler table 112 and the task-related contents of the task/handler priority table 101 are as illustrated in FIG. 1. Specifically, the task #2 should be prioritized over the task #1 and, reflecting this, the priority of the task #1 is set at "4," and that of the task #2 is set to "2". However, the task #1 registered the signal handler A1 for the signal "a" and this signal handler A1 is a processing particularly required to be immediately executed in response to the signal. Thus, a priority "1" is set for the signal handler A1. It should be noted that thick solid lines represent a state where a corresponding task is executed by securing the CPU 1, whereas a hatched thick line represents a state where a corresponding signal handler is executed by securing the CPU 1. Further, outlined thick lines represent a state where the processing of the OS 100 is executed by the CPU 1.

First, the task #2 having a higher priority is executed at time 0. The signal "a" corresponding to the task "1" is generated at time t11 (Step S1). The registration of the signal handler A1 corresponding to the signal "a" at time t12 is notified to the task/handler selecting section 141 (Steps S2, S3). More specifically, the signal handler A1 and the priority thereof are recorded in the task/handler priority table 101.

The signal handler and the task are scheduled from time t13 on (Steps S11, S12). Specifically, out of selection objects recorded in the task/handler priority table 101, a task or signal handler having a highest priority is selected. Objects to be scheduled here include the signal handler A1 having a priority "1", the task #2 having a priority "2" and the task #1 having a priority "4". As a result, the signal handler A1 having the highest priority is selected. Thereafter, the processing of the selected signal handler A1 is started from time t14 on (Steps S13 to S15).

When the processing of the signal handler A1 is completed at time t15 (Step S16), scheduling is carried out again (Steps S11, S12). Objects to be scheduled here include the task #2 having a priority "2" and the task #1 having a priority "4,". As a result, the task #2 having the higher priority is selected. The processing of the selected task #2 is started from time t16 on (Steps S13, S18 and S19). When the processing of the task #2 is completed at time t17, scheduling is carried out again (Steps S11, S12). As a result, the task #1 is executed from time t18 on (Steps S13, S18, S19).

In the example of FIG. 4, the processing of the signal handler A1 is immediately executed through the scheduling after the generation of the signal "a" and, thereafter, the processings of the tasks #2, #1 are successively executed. In other words, the priority design is realized among the tasks: independently of the immediate processing of the signal handler A1. In this way, the task scheduling apparatus 51 of this embodiment can freely design priorities among the tasks while ensuring the immediacy of the signal handler.

Second Embodiment

Figure 5:
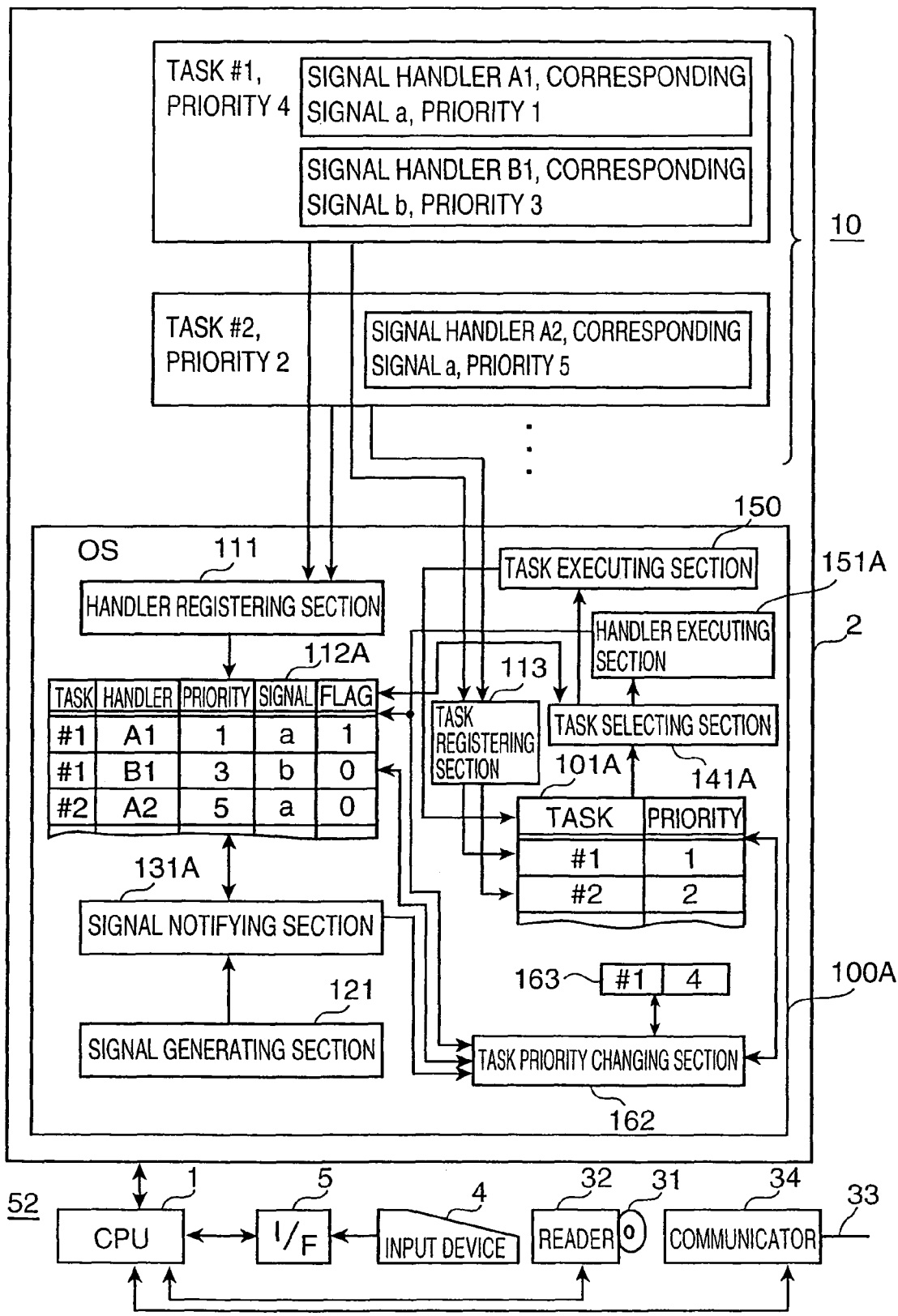
FIG. 5 is a block diagram showing a construction of a task scheduling apparatus according to a second embodiment of the invention.

FIG. 5 is a block diagram showing a construction of a task scheduling apparatus according to a second embodiment of the present invention. This task scheduling apparatus 52 constructs a part of a computing apparatus (computer). Similar to the first embodiment, the computing apparatus is provided with at least one central processing unit (CPU) 1 and a memory device 2. The computing apparatus may be additionally provided with an input device, an output device and other devices. In an example of FIG. 5, the computing apparatus is further provided with an input device 4 and an input interface 5.

In the task scheduling apparatus 51 of the first embodiment, the task and the signal handler corresponding to the signal are handled by the task/handler selecting section 141 as if they were equivalents, and the one having a highest priority is executed. By doing so, both the readiness of the signal handlers after the generation of the signal and a freedom of degree in designing the priorities among the tasks are realized.

Contrary to this, a task scheduling apparatus 52 of the second embodiment is constructed to temporarily change the priority of a task corresponding to a signal to the one of a signal handler corresponding to the signal. In this way, the task scheduling apparatus 52 realizes both the readiness of the signal handlers after the generation of the signal and a freedom of degree in designing the priorities among the tasks.

For this purpose, an OS 100A includes a task priority changing section 162 in the task scheduling apparatus 52. Further, the task/handler selecting section 141, the task/handler priority table 101 and the signal-handler executing section 151 of the task scheduling apparatus 51 are replaced by a task selecting section 141A, a task priority table 101A and a signal-handler executing section 151A, respectively. Furthermore, the signal-handler table 112 is replaced by a signal-handler table 112A, and the signal notifying section 131 is replaced by a signal notifying section 131A. A relief table 163 for assisting the function of the task priority changing section 162 belongs to the task priority changing section 162.

Unlike the task/handler priority table 101, only tasks and their priorities are recorded in the task priority table 101A. The task selecting section 141A selects a task having a highest priority from those in the task priority table 101A. Each task of the task 10 can record a content relating to itself in the task/handler priority table 101A by sending a request to a task registering section 113 and also can change the priority of its own registered in the task priority table 101A through the task registering section 113. Further, each task of the task 10 can change the priority thereof registered in the task priority table 101A through the task registering section 113.

A signal-handler registering section 111 registers tasks, handlers, priorities and signals in the signal-handler table 112A while relating them to each other as it does in the signal-handler table 112. Signal generation flags representing whether or not signals have been generated are recorded in relation to these attributes in the signal-handler table 112A. A value of each signal generation flag is changed by the signal notifying section 131A and the signal-handler executing section 151A.

Figure 6:
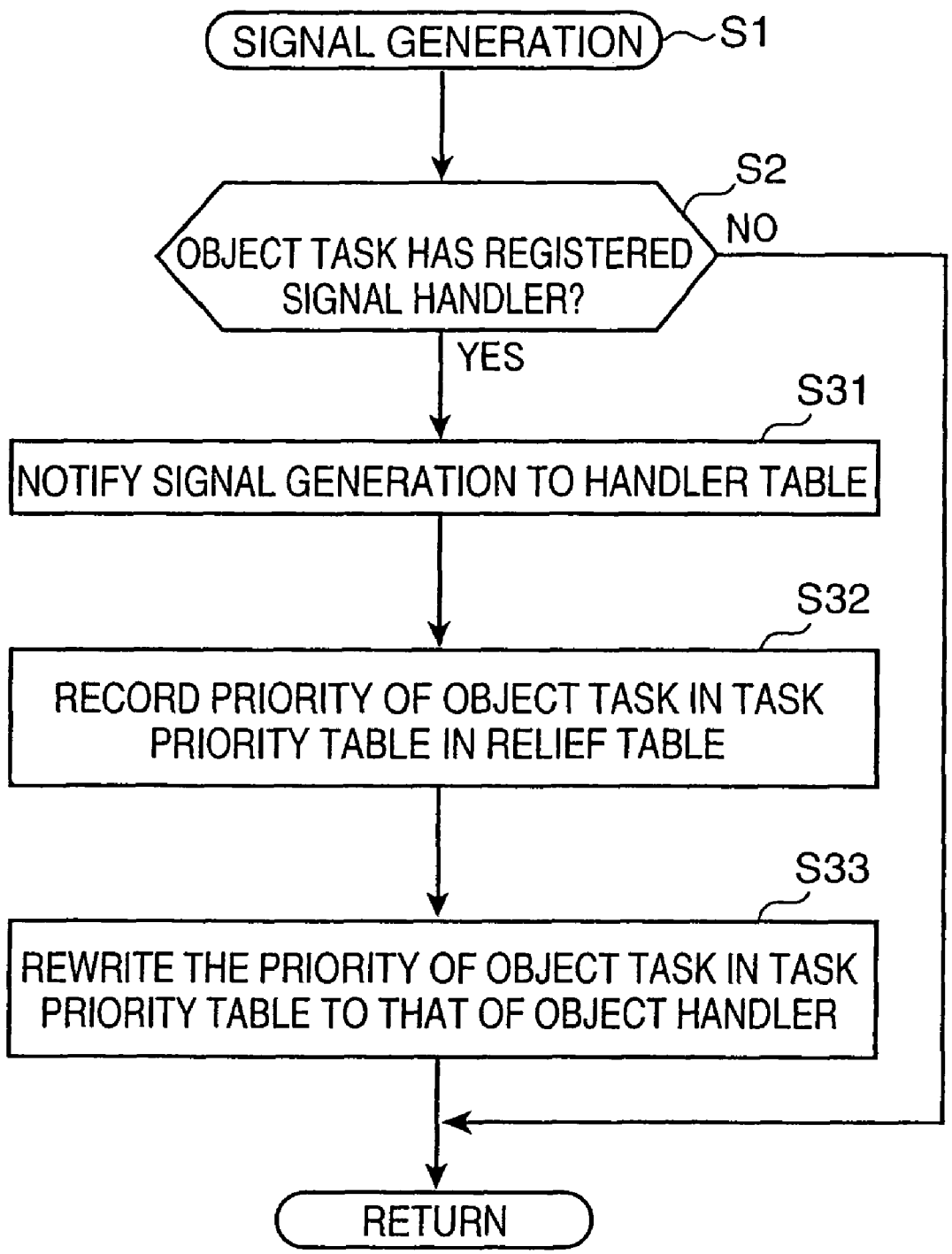
FIG. 6 is a flow chart showing the flow of processings by the apparatus of FIG. 5.
Figure 7:
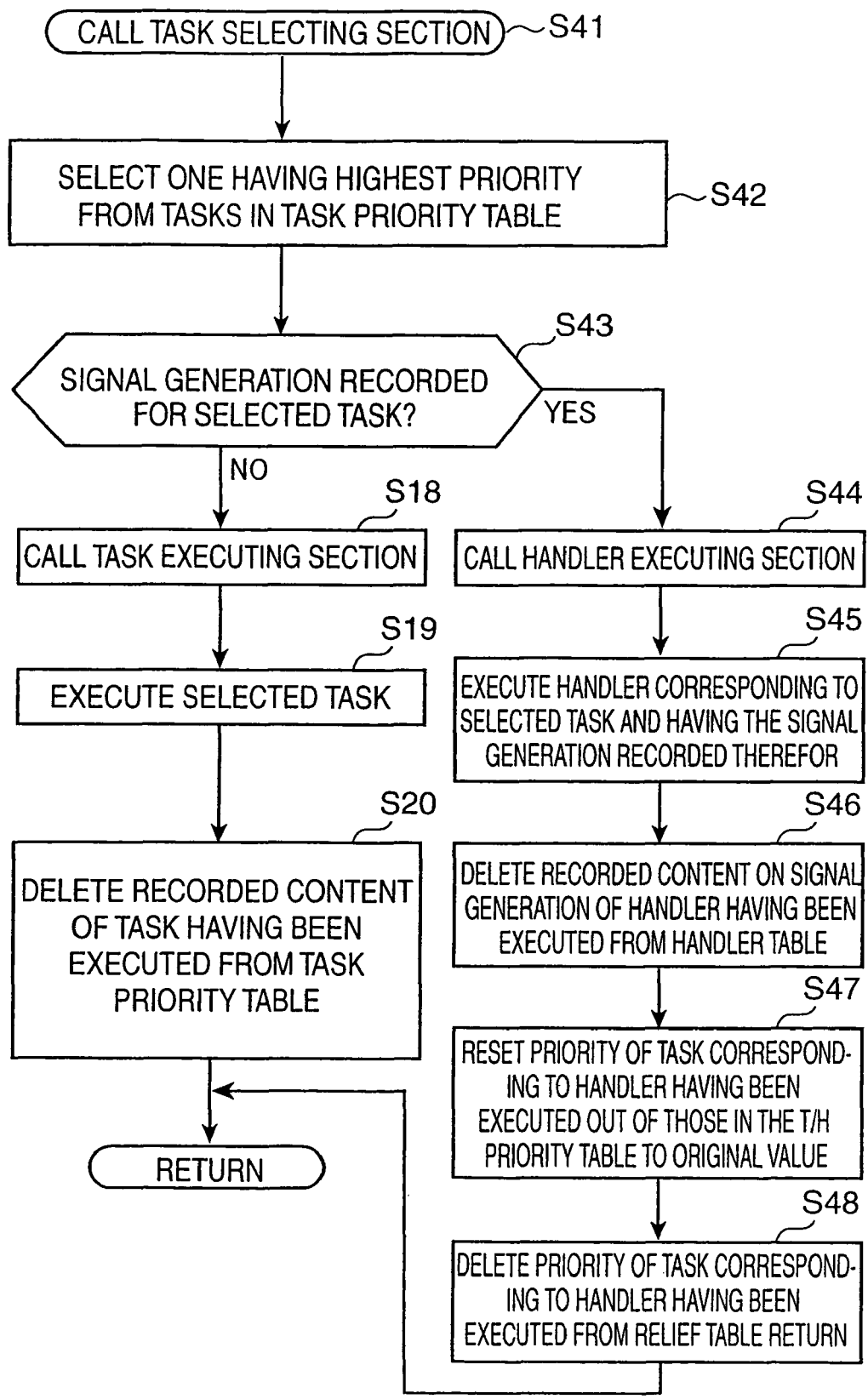
FIG. 7 is a flow chart showing the flow of processings by the apparatus of FIG. 1.

The construction of each part of the task scheduling apparatus 52 is described in detail while the operation thereof is described with reference to FIGS. 6 and 7. FIGS. 6 and 7 are flow charts showing flows of processings by the task scheduling apparatus 52 of this embodiment. In the flow charts below, processings similar to those in the flow charts described above are identified by the same reference numerals. It is assumed, as illustrated in FIG. 5, that one or more signal handlers are registered in the signal-handler table 112A and one or more tasks are registered in the task priority table 101A before the processings of FIGS. 6 and 7 are executed.

FIG. 6 shows the flow of processings executed as a signal is generated. Upon an occurrence of an event, a signal generating section 121 designates a task, generates a signal and notifies the generated signal to the signal notifying section 131A in Step S1. Next in Step S2, the signal notifying section 131A refers to the signal-handler table 112A to judge whether or not an object task corresponding to the generated signal has registered a signal handler. If the object task has registered the signal handler (YES in Step 2), the signal notifying section 131A notifies the generation of the signal to the signal-handler table 112A in Step S31. In other words, the signal notifying section 131A makes a corresponding signal generation flag in the signal-handler table 112A valid.

If signal handlers A1, B1, A2 are registered in the signal-handler table 112A as illustrated in FIG. 5, the signal notifying section 131A sets the signal generation flag corresponding to the object task #1 and the signal "a" in the signal/handler table 112, i.e. the signal generation flat corresponding to the signal handler A1 at a valid value "1" when the signal generating section 121 designates the task #1 and generates the signal "a."

Next in Step S32, the signal notifying section 131A calls the task priority changing section 162. Upon being called by the signal notifying section 131A, the task priority changing section 162 refers to the signal-handler table 112A to read the task whose signal generation flag is set at the valid value "1" and the priority thereof, and records the corresponding task and its priority in the task priority table 101A in the relief table 163. Next in Step S33, the task priority changing section 162 changes the corresponding task and its priority in the task priority table 101A to the read priority.

As illustrated in FIG. 5, if the flag corresponding to the task #1 and the handler A1 is set at the valid value "1" in the signal-handler table 112A, the task priority changing section 162 reads the task #1 and the priority "1" of the handler A1 and further changes the original priority "4" of the task #1 in the task priority table 101A to the read priority "1" (Step S33). In order to enable the priority after a change to be reset to the original one, the task priority changing section 162 changes the priority in the task priority table 101A (Step S33) after the priority "4" before the change is recorded in the relief table 163 while being related to the corresponding task #1 (Step S32). In this way, upon the generation of a signal, the priority of an object task is changed to that of an object signal handler.

Upon the completion of Step S33, the entire processing flow of FIG. 6 is ended. If the object task is judged not to have registered the signal handler (NO in Step S2), the entire processing flow of FIG. 6 is ended. Following the end of the processings of FIG. 6 (return in FIG. 6), the OS 100A may call the task selecting section 141A. In such a case, the processing in Step S41 of FIG. 7 is immediately started.

FIG. 7 shows the flow of processings executed as the task selecting section 141A is called. In Step S41, the task selecting section 141A is called. Similar to the task/handler selecting section 141 of the first embodiment, the task selecting section 141A is called by the OS 100A at a timing similar to a known task scheduling. Alternatively, the task selecting section 141A may be called upon the end of the processings of FIG. 6 as described above. Further, upon the end of the entire processing flow of FIG. 7, the task selecting section 141A may be immediately called by returning to Step S41.

In Step S42, the task selecting section 141A selects the task having a highest priority out of those recorded in the task priority table 101A. Next in Step S43, the task selecting section 141A refers to the signal-handler table 112A to judge whether or not there is any signal notified for the selected task, i.e. whether or not there is any signal whose signal generation flag is valid. If there is no signal notified for the selected task (NO in Step S43), the task selecting section 141A calls the task executing section 150 and notifies the selected task to the task executing section 150 in Step S18. In Step S19, the called task executing section 150 executes the notified task. In Step S20, the task executing section 150 deletes the recorded contents relating to the task whose execution has completed from the task priority table 101A.

On the other hand, if a signal is judged to have been notified for the selected task (YES in Step S43), the task selecting section 141A calls the signal-handler executing section 151A and notifies the signal handler corresponding to the task and the signal, i.e. the signal handler to be executed to the signal-handler executing section 151A in Step S44. Next in Step S45, the signal-handler executing section 151A executes the notified signal handler.

In the case that the tasks #1 and #2 are recorded in the task priority table 10A and the priorities thereof are respectively "1" and "2" as illustrated in FIG. 5, the task selecting section 141A selects the task #1 (Step S42). If the signal generation flag corresponding to the task #1 and the signal "a" is set at the valid value "1" in the signal-handler table 112A as shown in FIG. 5, the task selecting section 141A calls the signal-handler executing section 151A (Step S44) and the signal-handler executing section 151 executes the signal handler A1 corresponding to the valid flag (Step S45).

When the execution of the notified signal handler is completed in Step S45, the signal-handler executing section 151A deletes the recordation of the signal generation for the signal handler whose execution was completed from the signal-handler table 112A in Step S46. In other words, the signal-handler executing section 151A resets the signal generation flag corresponding to the signal handler in the signal-handler table 112 whose execution was completed from the valid value "1" to an invalid value "0." Accordingly, in the example of FIG. 5, the signal generation flag corresponding to the signal handler A1 in the signal-handler table 112 is reset from "1" to "0".

Next in Step S47, the signal-handler executing section 151A calls the task priority changing section 162. Upon being called by the signal-handler executing section 151A, the task priority changing section 162 rewrites the priority in the relief table 163 in the task priority table 101A, whereby the changed priority in the task priority table 101A is reset to the initial value. As a result, in the example of FIG. 6, the priority "1" of the task #1 in the task priority table 101A is reset to the original priority "4". Next in Step S48, the task priority changing section 162 deletes the content of the relief table 163 rewritten into the task priority table 101A.

Upon completing the processing in Step S20 or Step S48, the entire processing flow of FIG. 7 is ended. As described above, upon the end of the entire processing flow of FIG. 7, the task selecting section 141A may be immediately called by returning to Step S41.

Figure 8:
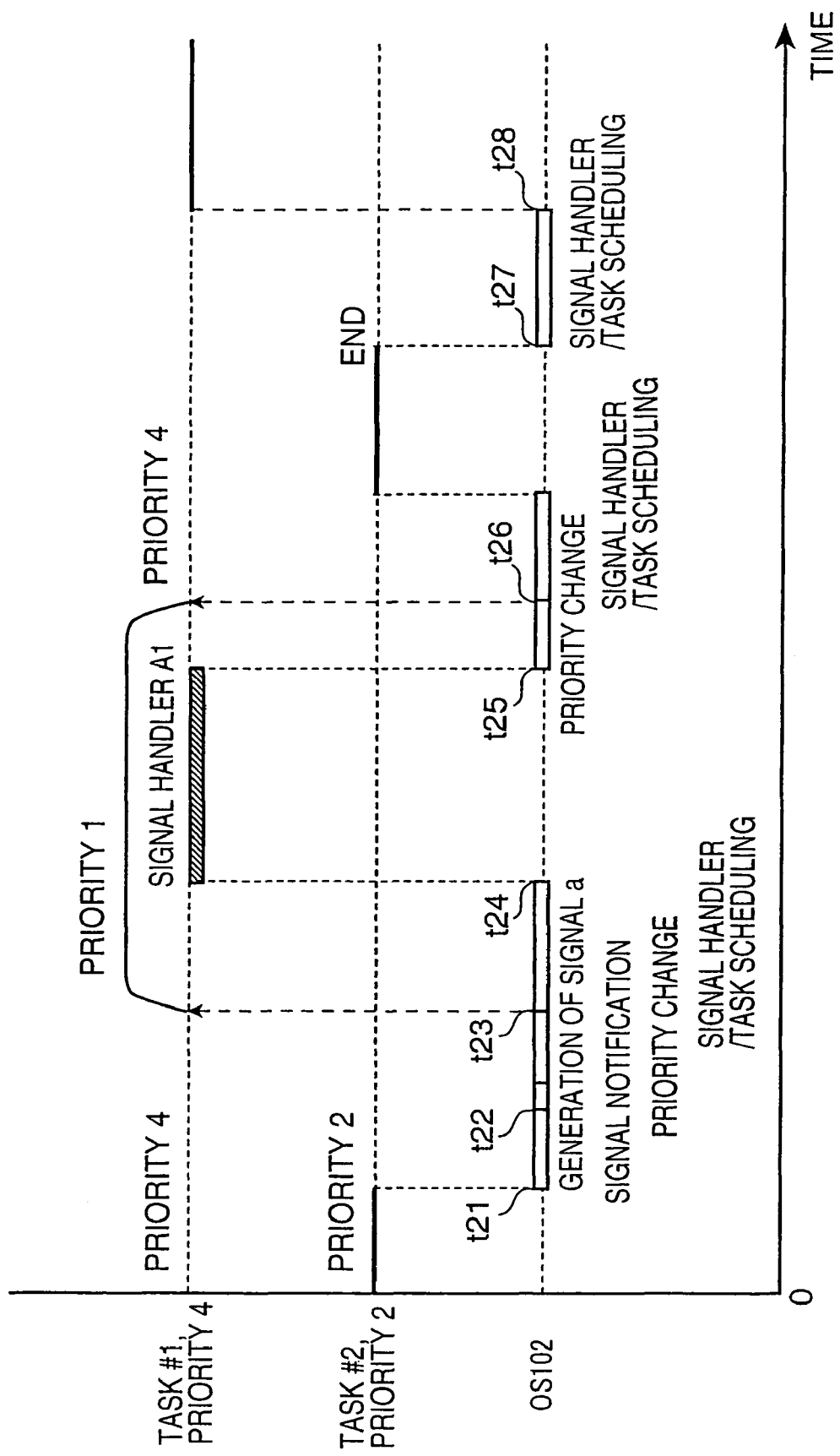
FIG. 8 is a timing chart showing one example of processings by the apparatus of FIG. 5.

FIG. 8 is a timing chart showing one example of processings in this embodiment. In the example of FIG. 8, it is assumed that two tasks #1, #2 exist in the memory device 2 as the task 10, the priorities of the tasks #1 and #2 are set at "4" and "2", and the priority of the signal handler A1 is set at "1" similar to the example of FIG. 4.

First, the task #2 having a higher priority is executed at time 0. The signal "a" corresponding to the task "1" is generated at time t21 (Step S1). When judging that the signal handler A1 is registered for the signal "a" at time t22 (Step S2), the signal notifying section 131A notifies the generation of the signal "a" to the signal-handler table 112A (Step S31). In other words, the signal notifying section 131A makes the signal generation flag corresponding to the signal handler A1 in the signal-handler table 112A valid.

Subsequently at time t23, the task priority changing section 162 changes the priority of the task #1 in the task priority table 101A to "1" which is the priority of the signal handler A1 (Steps S32 to S33) after recording the priority "4" as an original priority of the task #1 in the relief table 163. The task selecting section 141A schedules the signal handler and the task from time t23 on (Step S41, S42). Objects to be scheduled here includes the task #1 having a priority "1" and the task #2 having a priority "2". As a result, the task #1 having a higher priority is selected. Here, the task selecting section 141A judges that the task #1 has had the signal "a" notified thereto. As a result, the signal handler A1 is executed from time t24 on (Step S43 to S45).

The processing of the signal handler A1 is completed at time t25 and the priority of the task #1 in the task priority table 101A is changed to the original priority "4" (Step S46 to §48). Scheduling is carried out again from time t26 on (Steps S41, S42). Objects to be scheduled here include the task #2 having a priority "2" and the task #1 having a priority "4". As a result, the task #2 having a higher priority is selected and the processing of the task #2 is started from time t26 on. The task #2 is completed at time t27, and the task #1 is executed from time t28 on as a result of the scheduling (Steps S43, S18, S19).

In the example of FIG. 8, the processing of the signal handler A1 is immediately executed through the scheduling after the generation of the signal and, thereafter, the processings of the tasks #2, #1 are successively executed. In other words, the priority design is realized among the tasks independently of the immediate processing of the signal handler. In this way, the task scheduling apparatus 52 of this embodiment can freely design priorities among the tasks while ensuring the immediacy of the signal handler.

Specific Modification of the Second Embodiment

Figure 9:
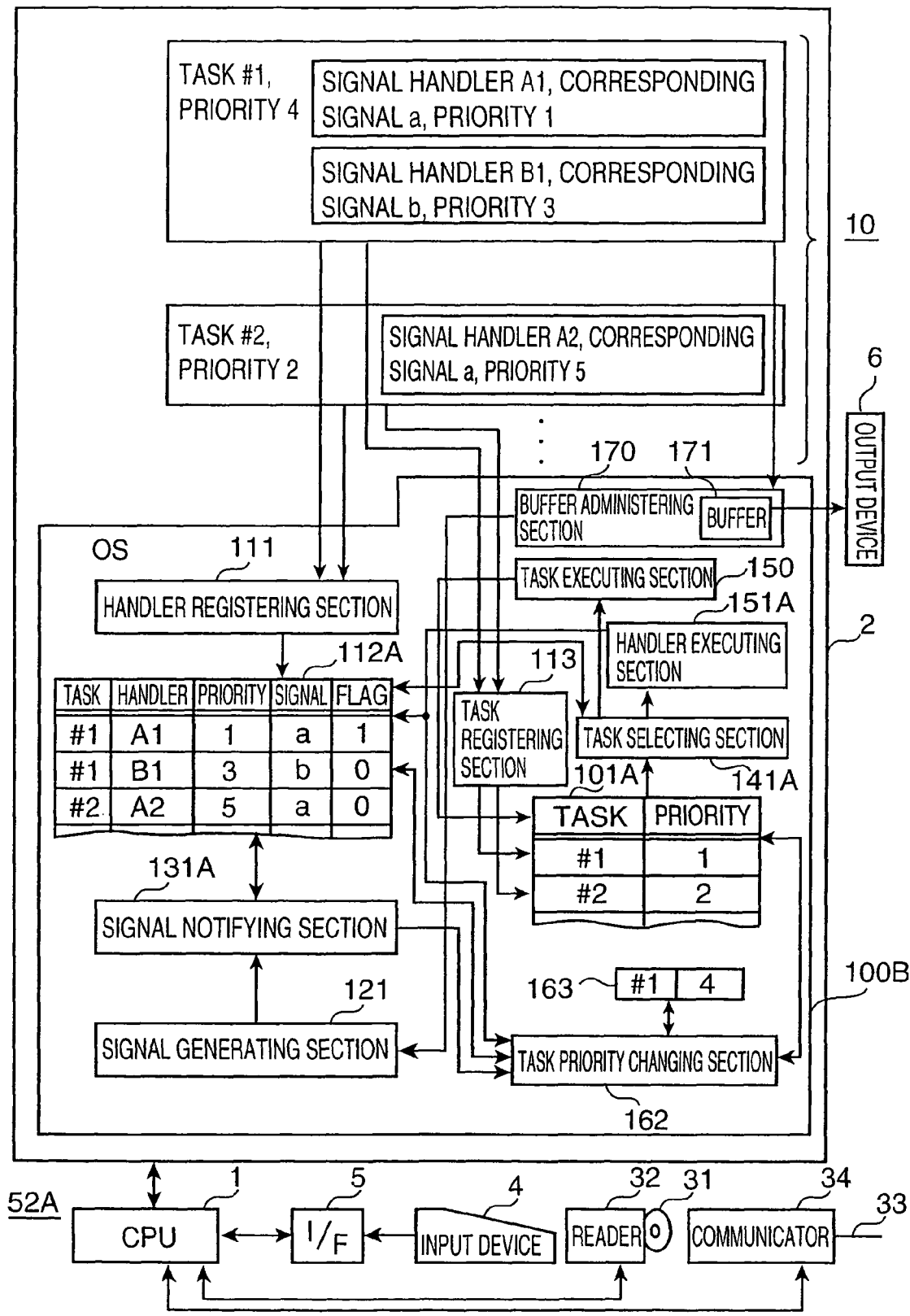
FIG. 9 is a block diagram showing a specific mode of the apparatus of FIG. 5.

FIG. 9 is a block diagram showing a specific mode of the task scheduling apparatus 52 according to the second embodiment. A computing apparatus including this task scheduling apparatus 52A is provided with an output device 6 in addition to the computing apparatus of FIG. 5. The output device 5 is, for example, a display device for outputting sounds and displaying images.

An OS 100B for realizing the task scheduling apparatus 52A in cooperation with the CPU 1 is provided with a buffer administering section 170 in addition to the respective elements (FIG. 5) of the OS 100A. The buffer administering section 170 administers a buffer 171 defined in a memory area of the memory device 2. The buffer 171 temporarily saves data to be outputted from the task #1 to the output device 6. The buffer administering section 170 is constructed, for example, as a system call. In such a case, upon writing a data in the buffer 171, the task #1 calls the buffer administering section 170 as a system call and transfers the data to be written as an argument to the buffer administering section 170. The buffer administering section 170 writes the transferred data in the buffer 171. Further, the signal handler A1 calls the task registering section 113 to prepare to change the priority of the task #1 to a higher value. In other words, if the signal generating section 121 designates the task #1 and generates a signal "a", the priority of the task, #1 becomes higher and the task #1 is more preferentially executed.

Upon being called, the buffer administering section 170 also detects an amount of data stored in the buffer 171. In the case that the detected data amount is null or below a predetermined reference amount, the buffer administering section 170 causes the signal generating section 121 to generate the signal "a" designating the task #1. Alternatively, a device for generating an interrupt signal when the data amount becomes null or below a predetermined reference amount may be provided, and the task scheduling apparatus 52A may be constructed such that the signal generating section 121 generates the signal "a" designating the task #1 by an interrupt handler corresponding to this interrupt. In this way, the signal handler A1 is quickly executed, thereby increasing the priority of the task #1 so that the execution of the task #1 is prioritized over other tasks. As a result, the task #1 writes the data in the buffer 171 to such an extent that the data amount in the buffer 171 exceeds the reference amount.

That the data amount in the buffer 171 falls below the reference amount means that the priority of the task #1 is too low. In the task scheduling apparatus 52A, the excessively low priority of the task #1 is changed to a higher value. In this way, an amount of the data stored in the buffer 171 can be kept at a certain level or higher, whereby a pause in the output of the data to the output device 6 can be avoided.

Third Embodiment

Figure 10:
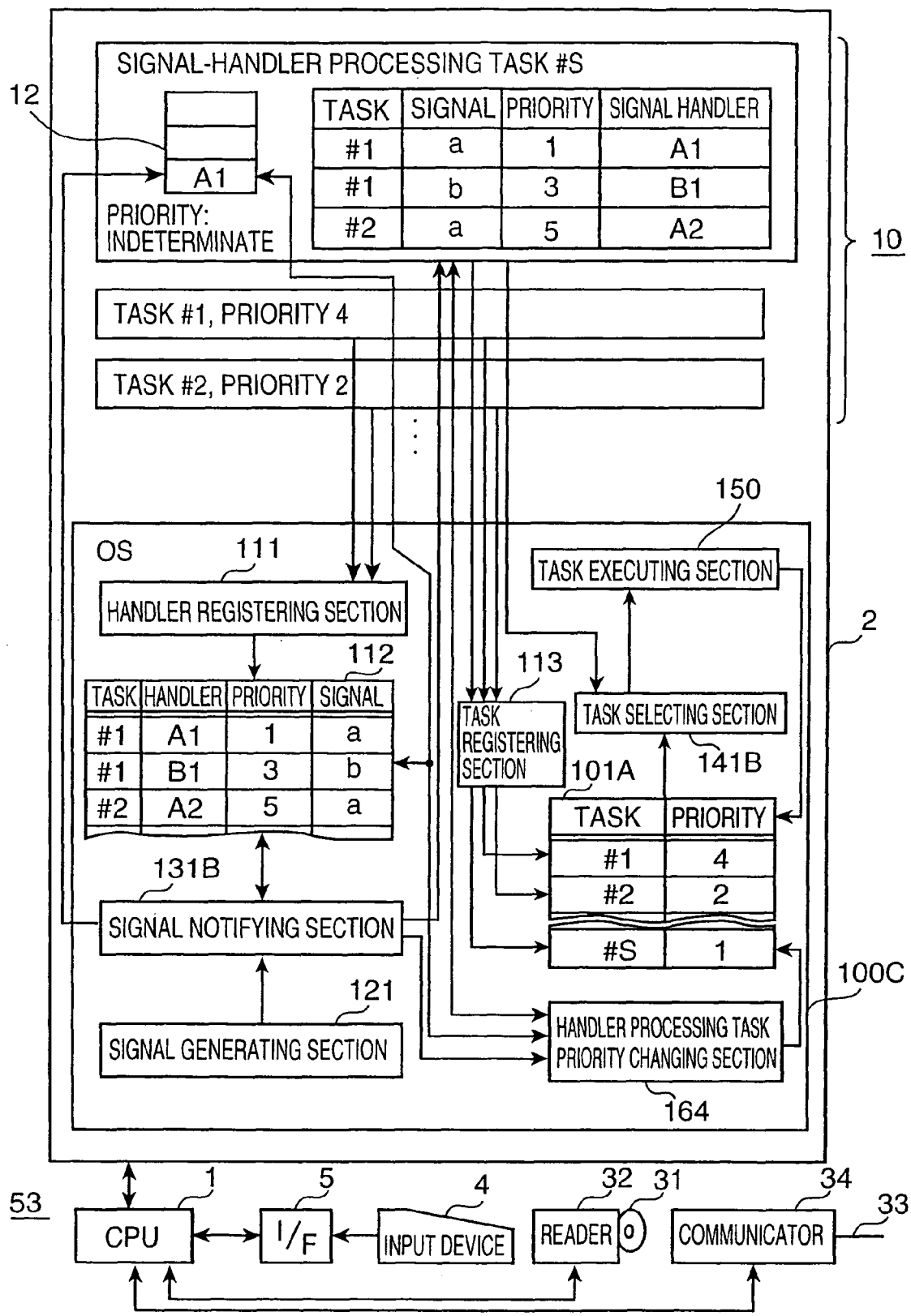
FIG. 10 is a block diagram showing a construction of a task scheduling apparatus according to a third embodiment of the invention.

FIG. 10 is a block diagram showing a construction of a task scheduling apparatus according to a third embodiment of the present invention. This task scheduling apparatus 53 constructs a part of a computing apparatus (computer). Similar to the first and second embodiments, the computing apparatus is provided with at least one central processing unit (CPU) 1 and a memory device 2. The computing apparatus may be additionally provided with an input device, an output device and other devices. In an example of FIG. 10, the computing apparatus is further provided with an input device 4 and an input interface 5.

In the task scheduling apparatus 53 of this embodiment, a task 10 includes one or more signal-handler processing task #S. In this embodiment, signal handlers of ordinary tasks #1, #2, . . . #N (N is a natural number) are all processed by the signal-handler processing task #S. In the example of FIG. 10, the task #1 has registered a signal handler A1 having a priority "1" in correspondence with a signal "a" and a signal handler B1 having a priority "3" in correspondence with a signal "b" in the signal-handler processing task #2. Likewise, the task #2 has registered a signal handler A2 having a priority "5" in correspondence with the signal "a" in the signal-handler processing task #S. The signal-handler processing task #S has a queue 12 for registering a signal handler brought into an executable state upon the notification of a signal. FIG. 10 shows a state where the signal handler A1 is registered in the queue 12. The priority of the signal-handler processing task #S is so changed as to correspond with a highest priority in the queue 12 and is indeterminate.

Upon being processed by the CPU 1, i.e. being scheduled and executed, the signal-handler processing task #S has the signal handler having the highest priority in the queue 12 processed. If there is no signal handler to be processed in the queue 12, the signal-handler processing task #S enters a sleep state. Every time processing one signal handler in the queue, the signal-handler processing task #S calls a signal-handler processing task priority changing section 164 to have the priority thereof changed. Simultaneously, the signal-handler processing task #S calls a task selecting section 141A to carry out scheduling again.

As described above, the task scheduling apparatus 53 of this embodiment registers a corresponding signal handler in the queue 12 in the signal-handler processing task #S upon the generation of a signal. Then, the task scheduling apparatus 53 causes the priority of the signal-handler processing task #S to coincide with the highest priority in the queue 12, thereby making the signal-handler processing task #S an object to be scheduled together with the other ordinary tasks. In the case that the signal-handler processing task #S is scheduled, the task scheduling apparatus 53 executes a signal handler having a highest priority in the queue 12. In this way, the task scheduling apparatus 53 realizes both the readiness of the signal handlers after the generation of the signal and a degree of freedom in designing the priorities among the tasks.

For this purpose, in the task. scheduling apparatus 53, an OS 100B includes the signal-handler processing task priority changing section 164 in place of the task priority changing section 162 and the relief table 163 in the task scheduling apparatus 52 (FIG. 5). Further, the signal notifying section 131A in the task scheduling apparatus 52 is replaced by a signal notifying section 131B. Furthermore, the signal-handler table 112A in the task scheduling apparatus 52 is replaced by a signal-handler table 112 similar to the task scheduling apparatus 51 (FIG. 1).

The signal notifying section 131B registers an object signal handler corresponding to a notified signal in the queue 12 of the signal-handler processing task, and lets the signal-handler processing task #S wake up when the signal-handler processing task #S is in the sleep state. Thereafter, the signal notifying section 131B calls the signal-handler processing task priority changing section 164.

The signal-handler processing task priority changing section 164 changes the priority of the signal-handler processing task #S to a highest one of the priorities of the signal handlers in the queue 12. The task selecting section 141A selects the task having a highest priority out of the signal-handler processing task #S and the ordinary tasks #1 and the like.

Similar to the ordinary tasks #1 and the like, the signal-handler processing task #S records a content relating thereto in a task priority table 101A by sending a recording request to a task registering section 113. Similar to the ordinary tasks #1 and the like, the signal-handler processing task #S sends the recording request, for example, when being written in the memory device 2 or until the execution thereof should be executed for the first time after being written in the memory device 2.

The priority of the signal-handler processing task #S to be recorded in the task priority table 101A may be any arbitrary value if no signal handler exists in the queue 12. When no signal handler exists in the queue 12, the signal-handler processing task #S is in the sleep state as described later. Since the task selecting section 101A does not select the sleeping one from the tasks in the task priority table 101A, it causes no problem even if the priority takes an arbitrary value. Accordingly, it does not matter which value is recorded as the priority of the signal-handler processing task #S when the content relating to the signal-handler processing task #S is recorded in the task priority table 101A through the task registering section 113.

Figure 11:
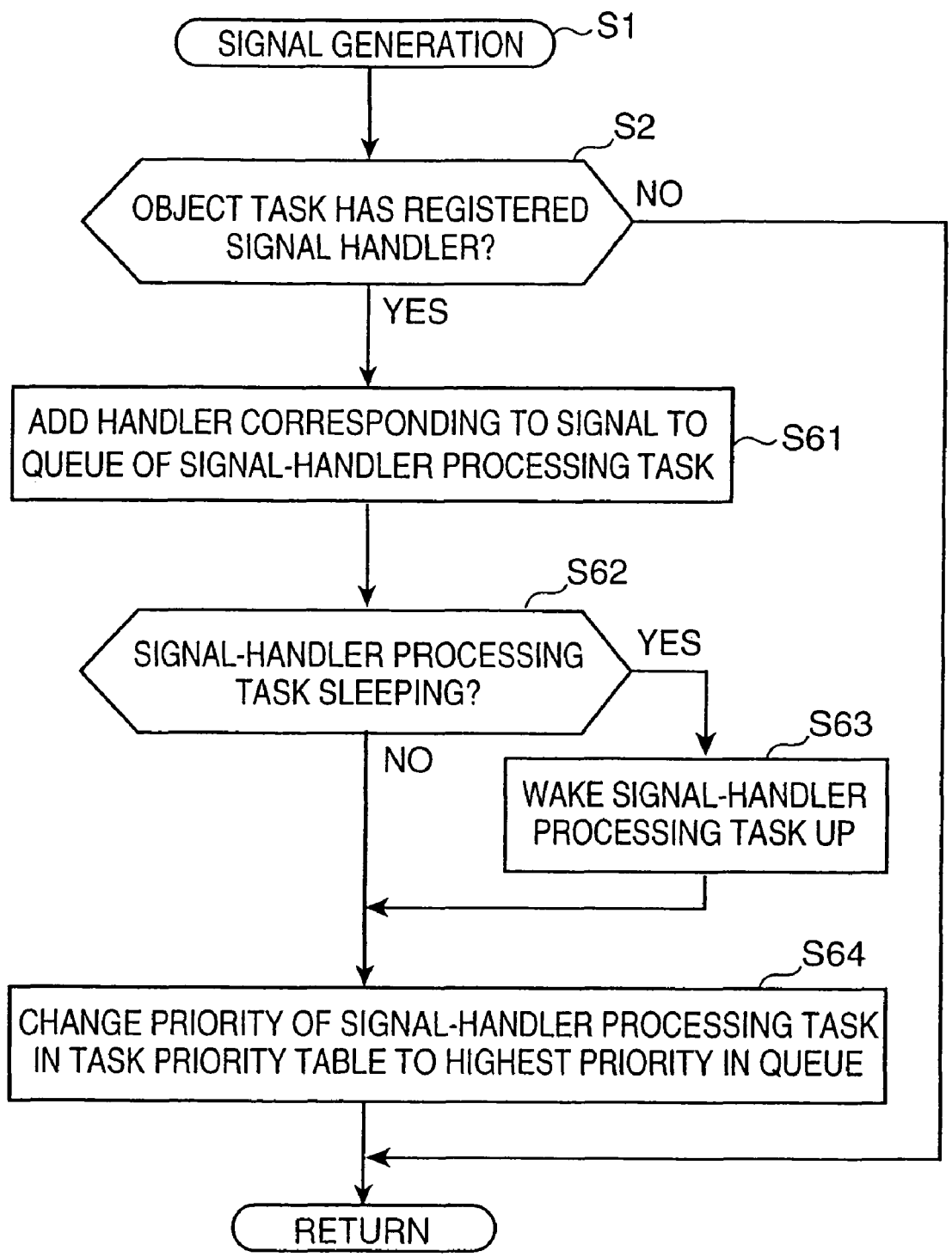
FIG. 11 is a flow chart showing the flow of processings by the apparatus of FIG. 10.
Figure 12:
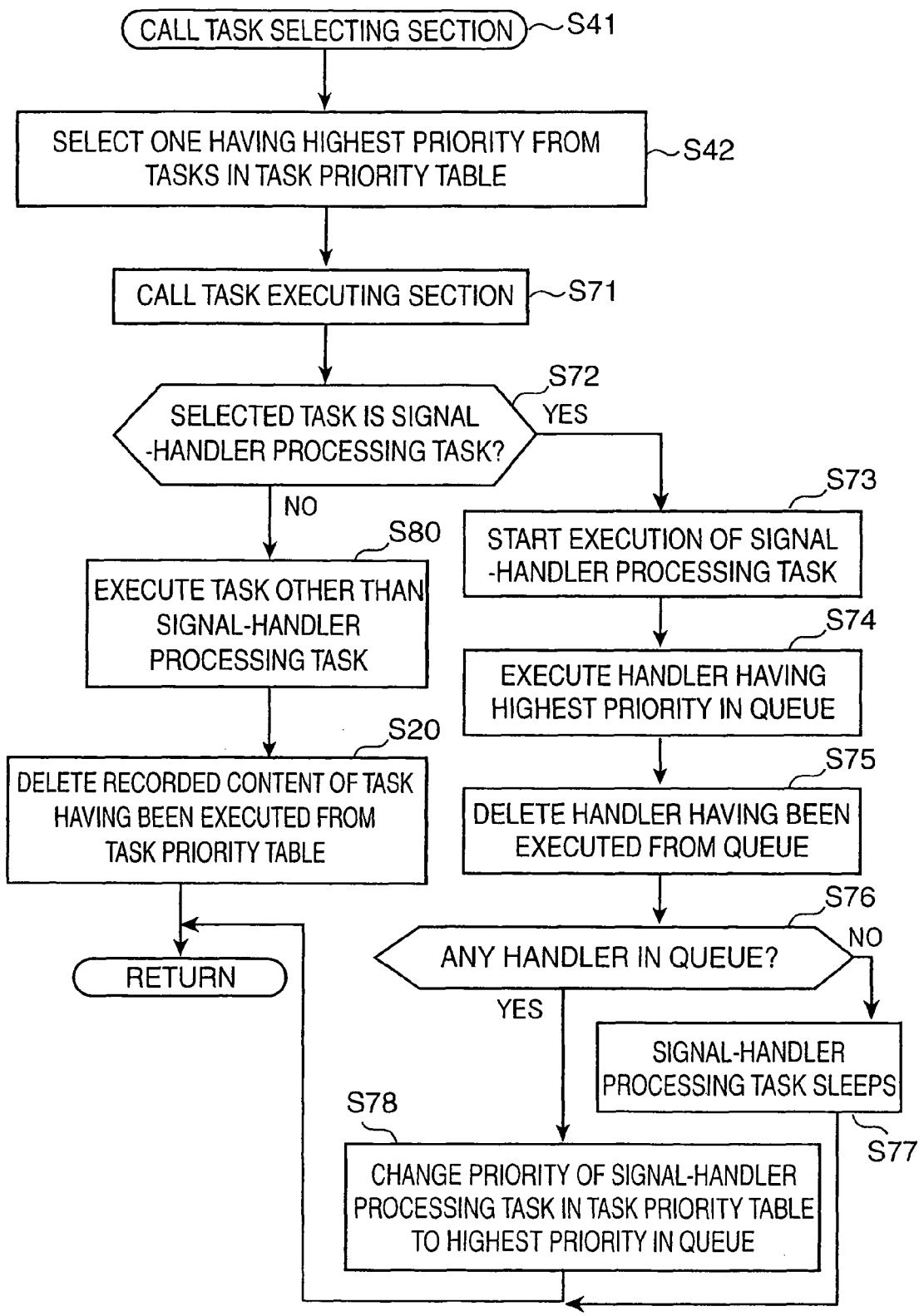
FIG. 12 is a flow chart showing the flow of processings by the apparatus of FIG. 10.

The construction of each part of the task scheduling apparatus 53 is described in detail while the operation thereof is described with reference to FIGS. 11 and 12. FIGS. 11 and 12 are flow charts showing flows of processings by the task scheduling apparatus 53 of this embodiment. It is assumed, as illustrated in FIG. 10, that one or more signal handlers are registered in the signal-handler table 112 and one or more tasks are registered in the task priority table l01A before the processings of FIGS. 11 and 12 are executed.

FIG. 11 shows the flow of processings executed as a signal is generated. Upon an occurrence of an event, a signal generating section 121 designates a task, generates a signal and notifies the generated signal to the signal notifying section 131B in Step S1. Next in Step S2, the signal notifying section 131B refers to the signal-handler table 112 to judge whether or not an object task corresponding to the generated signal has registered a signal handler.

If the object task has registered the signal handler (YES in Step 2), the signal notifying section 131B registers an object signal handler corresponding to the notified signal in the queue 12 in Step S61. If the signal handlers A1, B1, A2 are registered in the signal-handler table 112 as illustrated in FIG. 10, the signal notifying section 131B registers the signal handler A1 in the queue 12 when the signal generating section 121 designates the task #1 and generates the signal "a."

In following Step S62, the signal notifying section 131B judges whether or not the signal-handler processing task #S is in the sleep state. If the signal-handler processing task #S is in the sleep state (YES in Step S62), the signal notifying section 131B wakes the signal-handler processing task #S up in Step S63.

Generally, the tasks written in the memory device 2 takes two states: sleep state and wake-up state. In the wake-up state, the task enters an active state to be executed upon being called while entering an inactive state to wait for a call when no call is made for it. On the other hand, in the sleep state, the task is not executed even upon being called. Accordingly, in order to make the task in the sleep state executable, it is necessary to transfer the state of the task from the sleep state. to the wake-up state, i.e. to wake the task up. It should be noted that the state of the task before being written in the memory device 2 is called to be an idle state.

If the signal-handler processing task #S is judged not to be in the sleep state in Step S62 (NO in Step S62) or if the processing in Step S63 is completed, the processing of Step S64 is executed. In Step S64, the signal notifying section 131B calls the signal-handler processing task priority changing section 164. The called signal-handler processing task priority changing section 164 refers to-the queue 12 and the signal-handler table 112 to change the priority of the signal-handler processing task #S in the task priority table 101A to the highest one of the priorities of the signal handlers registered in the queue 12.

For example, in the case that the signal generating section 121 designates the task #1 and generates the signal "a", the signal notifying section 131B changes the priority of the signal-handler processing task #S in the task priority table 101A to the priority "1" of the signal handler A1 registered in the signal-handler table 112.

Upon completing the processing of Step S64, the entire processing flow of FIG. 11 is ended. If the object task is judged not to have registered the signal handler in Step S2 (NO in Step S2), the entire processing flow of FIG. 11 is ended. Following the end of the processing flow of FIG. 11 (RETURN in FIG. 11), the OS 100B may call the task selecting section 141A. In such a case, the processing in Step S41 of FIG. 12 is immediately started.

FIG. 12 shows the flow of processings executed upon calling the task selecting section 141A. In Step S41, the task selecting section 141A is called. A calling timing of the task selecting section 141A is already described in the description of the second embodiment. In following Step S42, the task selecting section 141A selects the task having a highest priority out of those recorded in the task priority table 101A. As illustrated in FIG. 10, the task selecting section. 141A selects the signal-handler processing task #S (Step S42) if the tasks #1, #2 and the signal-handler processing task #S are recorded in the task priority table 101A, and the priorities thereof are respectively "4", "2" and "1".

Next in Step S71, the task selecting section 141A calls the task executing section 150 and notifies the selected task to the task executing section 150. In Steps S72, S73, S74 and S80, the called task executing section 150 executes the notified task. Accordingly, the task executing section 150 executes the signal-handler processing task #S (Steps S73, S74) if the selected task is the signal-handler processing. task #S (YES in Step S72) while executing an ordinary task (Step S80) if the selected. task is a task other than the signal-handler processing task #S, i.e. an ordinary task (NO in Step S72). In Step S20 following Step S80, the task executing section 150 deletes the recorded content relating to the task whose execution was completed from the task/handler priority table 101A.

When the execution of the signal-handler processing task #S is started in Step S73, the signal-handler processing task #S executes the signal-handler having the highest priority in the queue 12 in Step S74. The signal handler A1 is executed in Step S74 if only the signal handler A1 exists in the queue 12 as illustrated in FIG. 10.

Upon the completion of the processing of Step S74, i.e. the execution of the signal handler having the highest priority in the queue 12, the signal-handler processing task #S deletes the signal handler whose execution was completed from the queue 12 in Step S75. In following Step S76, the signal-handler processing task #S judges whether there exists any signal handler in the queue 12. If no signal handler exists in the queue 12 (NO in Step S76), the signal-handler processing task #S enters the sleep state in Step S77.

If the existence of the signal handler in the queue 12 is judged in Step S76 (YES in Step S76), the signal-handler processing task #S calls the signal-handler processing task priority changing section 164 in Step S78. The called signal-handler processing task priority changing section 164 refers to the queue 12 and the signal-handler table 112 to change the priority of the signal-handler processing task #S in the task priority table 101A to the highest one of the priorities of the signal handlers recorded in the queue 12. The content of the processing in Step S78 is equivalent to that in Step S64.

Upon completion of the processing of any one of Steps S77, S78 and S20, the entire processing flow of FIG. 12 is ended. Upon the end of the entire processing flow of FIG. 12, the task selecting section 141A may be immediately called by returning to Step S41.

By Steps S64 and S78, the signal-handler processing task #S constantly has the same priority as the highest one of all the signal handlers in the queue 12 to be executed.

FIG. 13 is a timing chart showing one example of processings in this embodiment. In the example of FIG. 13, it is assumed that two tasks #1, #2 exist in the memory device 2 as the task 10, the priorities of the tasks #1 and #2 are set at "4" and "2", and the priorities of the signal handlers A1, B1, A2 are set at "1", "3", "5" similar to the example of FIG. 4.

The signal handler B1 having the priority "3" is registered in the queue 12 of the signal-handler processing task #S at time 0. The priority of the signal-handler processing task #S at this time is "3" equal to the priority of the signal handler B1.

The signal "a" corresponding to the task #1 is generated at time t31 (Step S1). At time t32, the signal notifying section 131B notifies the generation of the signal to the signal-handler processing task #S. In other words, the signal notifying section 131B registers the signal handler A1 the task #1 registered as a signal handler corresponding to the signal "a" in the queue 12 at this time (Steps S2, S61). Subsequently, at time t33, the priority of the signal-handler processing task #S is changed to "1" which is the highest priority in the queue 12 (Step S64).

The task scheduling is completed at time t34. Objects to be scheduled here include the signal-handler processing task #S having a priority "1", the task #4 having a priority "4", and the task #2 having a priority "2". As a result, the signal-handler processing task #S having the highest priority is selected (Step S41, S42). The signal-handler processing task #S executes the signal handler A1 having the highest priority in the queue 12 (Steps S71 to S74). When the execution of the signal handler A1 is completed, the signal handler A1 whose execution was completed is deleted from the queue 12 (Step S75). Thereafter, at time t35, the priority of the signal-handler processing task #S is changed to "3" which is the highest priority in the queue 12 (Steps S76, S78).

The task scheduling is completed at time t36. Objects to be scheduled here include the signal-handler processing task #S having a priority "3", the task #4 having a priority "4", and the task #2 having a priority "2". As a result, the task #2 having the highest priority is selected and executed (Steps S41, S42, S71, S72, S80).

After the execution of the task #2 is completed and the task #2 is deleted from the objects to be scheduled at time t37 (Step S20), the next scheduling is carried out. Objects to be scheduled here include the signal-handler processing task #S having a priority "3" and the task #2 having a priority "4". As a result, the signal-handler processing task #S having a higher priority is selected and executed (Steps S41, S42, S71, S72, S73). The signal-handler processing task #S executes the signal handler B1 having the highest priority in the queue 12 (Step S74). Since the queue 12 is empty after the execution of the signal handler B1, the signal-handler processing task #S sleeps at time t38 (Steps S76, S77). Thereafter, the next scheduling is carried out at time t39 and the remaining task #1 is executed.

In the example of FIG. 13, the signal handler A1 having a high priority is immediately executed through the scheduling upon the generation of the signal. Thereafter, the task #2 and the signal handler Bi having a lower priority and the task #1 are executed in this order. While the signal handler having a high priority is executed, the priority design can be independently realized among the tasks. In this way, the task scheduling apparatus 53 of this embodiment can freely design priorities among the tasks while ensuring the immediacy of the signal handler.

Summary of the Embodiments

The summary of the embodiments of the present invention is described below.

(1) A task scheduling apparatus is an apparatus for parallelly processing a plurality of tasks assigned with priorities and including one or more tasks each having one or more signal handlers assigned with priorities, comprising: a signal-handler registering section for registering the respective signal handlers of the one or more tasks, signals corresponding to the respective signal handlers and the priorities of the respective signal handlers while relating them to each other; a signal generating section for generating a signal; and a selection executing section for specifying an object signal handler as a signal handler corresponding to the generated signal and a priority thereof by referring to contents registered by the signal-handler registering section, and executing the one having a highest priority out of the plurality of tasks and the object signal handler.

With this construction, the object signal handler corresponding to the generated signal and the priority thereof are specified by referring to the contents registered by the signal-handler registering section, and the one having the highest priority out of the plurality of tasks and the object signal handler is executed. In other words, the signal handler is executed with the priority independent of the task it belongs to. Thus, by giving a high priority to the signal handler, the readiness of the signal handler in response to the signal can be improved without hindering a degree of freedom in designing the priorities among the tasks.

(2) A task scheduling apparatus is preferably the task scheduling apparatus (1) and further comprises a priority table for recording the plurality of tasks and the priorities thereof while relating them to each other and recording the object signal handler and the priority thereof while relating them to each other, wherein the selection executing section includes: a signal notifying section for specifying the object signal handler and the priority thereof by referring to the contents registered by the signal-handler registering section, and recording the object signal handler and the priority thereof in the priority table while relating them to each other; a selecting section for selecting a task or a signal handler corresponding to the highest one of a plurality of priorities recorded in the priority table as an object to be executed by referring to the priority table; and an executing section for executing the task or the signal handler selected by the selecting section.

With this construction, the tasks and the object signal handler are recorded in the priority table, and the task or the signal handler is selected as an object to be executed in accordance with the priorities recorded in the priority table. Thus, by giving a high. priority to the signal handler, the readiness of the signal handler in response to the signal can be improved without hindering a degree of freedom in designing the priorities among the tasks. In other words, both the readiness of the signal handler and a degree of freedom in designing the priorities among the tasks can be realized by a simple construction.

(3) A task scheduling apparatus is preferably the task scheduling apparatus (2), wherein the signal notifying section deletes the recorded content relating to the signal handler whose execution has been completed from the priority table when the executing section completes the execution of the signal handler.

With this construction, since the recorded content relating to the signal handler whose execution has been completed is deleted from the priority table upon the completion of the execution of the signal handler, the selecting section can exclude the signal handler having been executed from the objects to be selected only by referring to the priority table without separately receiving information on the completion of the execution. In other words, both the readiness of the signal handler and a degree of freedom in designing the priorities among the tasks can be realized by a simpler construction.

(4) A task scheduling apparatus is preferably the task scheduling apparatus (1) and further comprises a priority table for recording the plurality of tasks and the priorities thereof while relating them to each other, wherein: the signal-handler registering section further registers tasks corresponding to the respective signal handlers while relating them to each other; and the selection executing section includes: a signal notifying section for specifying the object signal handler, an object priority which is the priority of the object signal handler, and an object task which is a task corresponding to the object signal handler by referring to the contents registered by the signal-handler registering section, a priority changing section for changing the priority of the object task out of the plurality of tasks recorded in the priority table to the object priority, a selecting section for selecting a task corresponding to the highest one of a plurality of priorities recorded in the priority table as an object to be executed by referring to the priority table, and an executing section for executing the selected task if the task selected by the selecting section is not the object task while executing the object signal handler if the selected task is the object task.

With this construction, the tasks are recorded in the priority table, the priority of the object task corresponding to the generated signal out of the recorded tasks is changed to the priority of the object signal handler corresponding to the generated signal. Further, the task is selected as the object to be executed in accordance with the priorities recorded in the priority table, and the corresponding object signal handler is executed if the object task is selected. Thus, by giving a high priority to the signal handler, the immediacy of the signal handler in response to the signal can be improved without hindering a degree of freedom in designing the priorities among the tasks. In other words, both the readiness of the signal handlers and a degree of freedom in designing the priorities among the tasks can be realized by a simple construction.

(5) A task scheduling apparatus is preferably the task scheduling apparatus (4), wherein the priority changing section resets the priority of the object task corresponding to the object. signal handler whose execution has been completed, out of the plurality of tasks recorded in the priority table, to the one before it had been changed to the object priority when the executing section completes the execution of the object signal handler.

With this construction, since the priority of the task corresponding to the signal handler whose execution has been completed is reset to the original priority upon the completion of the execution of the signal handler, the selecting section can select the task based on the original priority only by referring to the priority table without separately receiving information on the completion of the execution and information on the original priority of the task. In other words, both the readiness of the signal handler and a degree of freedom in designing the priorities among the tasks can be realized by a simpler construction.

(6) A task scheduling apparatus is preferably the task scheduling apparatus (1) and further comprises a priority table for recording the plurality of tasks and the priorities thereof while relating them to each other, wherein: the plurality of tasks include a signal-handler processing task which is assigned with a variable priority, includes a queue in which at least one signal handler to be executed is registered, and causes executed a highest priority handler having a highest priority out of the at least one signal handler registered in the queue upon being called and executed; the selection executing section includes: a signal notifying section for specifying the object signal handler by referring to contents registered by the signal-handler registering section and registering the object signal handler in the queue, a priority changing section for specifying the highest priority handler out of the at least one signal handler registered in the queue by referring to the contents registered by the signal-handler registering section when the content registered in the queue has been changed, and changing the priority of the signal-handler processing task recorded in the priority table to the priority of the specified highest priority handler, a selecting section for selecting the task corresponding to the highest one of a plurality of priorities recorded in the priority table as an object to be executed by referring to the priority table, and an executing section for executing the task selected by the selecting section.

With this construction, the plurality of tasks include the signal-handler processing task, the object signal handler corresponding to the generated signal is registered in the queue of the signal-handler processing task and, thereupon, the priority of the signal-handler processing task is changed to that of the highest priority handler in the queue. The plurality of tasks are recorded in the priority table and the task is selected as the object to be executed based on the priority recorded in the priority table. Further, in the case that the signal-handler processing task is selected, the highest priority handler in the queue is executed. Thus, by giving a high priority to the signal handler, the immediacy of the signal handler in response to the signal can be improved without hindering a degree of freedom in designing the priorities among the tasks. In other words, both the readiness of the signal handler and a degree of freedom in designing the priorities among the tasks can be realized by a simple construction.

(7) A task scheduling apparatus is preferably the task scheduling apparatus (6), wherein the signal-handler processing task deletes the registration of the highest priority handler whose execution has been completed from the queue when the execution of the highest priority handler is completed.

With this construction, the registration of the highest priority handler whose execution has been completed is deleted from the queue when the execution of the highest priority handler is completed. As a result, the registered content of the queue is changed, and therefore, the priority of the signal-handler processing task recorded in the priority table is changed to the priority of a new highest priority handler in the queue. Thus, the at least one signal handler can be executed stepwise in accordance with the priority independent of the tasks by such a simple construction that the selecting section selects the task as the object to be executed in accordance with the priorities recorded in the priority table.

(8) A task scheduling apparatus is preferably any one of the task scheduling apparatuses (2) to (7) and further comprises a task registering section for registering the priorities of the one or more tasks in the priority table upon a registration instruction from the one or more tasks.

With this construction, each task can register the priority of its own in the priority table since the task registering section is provided.

(9) A task scheduling apparatus is preferably the task scheduling apparatus (8), wherein the task registering section changes the priorities of the one or more tasks registered in the priority table upon a change instruction from the one or more tasks.

With this construction, each task can change the priority of its own registered in the priority table through the task registering section.

(10) A task scheduling apparatus is preferably the task scheduling apparatus (9) and further comprises a buffer for temporarily storing data outputted from a specific task which is one of the one or more tasks, and a buffer administering section for making a notification to the signal generating section when an amount of the data stored in the buffer falls below a predetermined reference amount, wherein the specific task includes a specific signal handler for causing the task registering section to change the priority of the specific task registered in the priority table to a higher value by giving an instruction to the task registering section, and the signal generating section generates a signal corresponding to the specific signal handler upon receiving the notification.

With this construction, when the amount of the data from the specific task stored in the buffer falls below the predetermined reference amount, the signal corresponding to the specific signal handler is generated and the specific signal handler is executed, whereby the priority of the specific task registered in the priority table is changed to a higher value. Thereafter, the output of the data from the specific task is promoted since the specific task is selected and executed in higher priority. This suppresses the exhaustion of the data in the buffer. As a result, an inconvenience of pausing the data output from the buffer can be suppressed.

(11) A task scheduling apparatus is preferably any one of the task scheduling apparatuses (1) to (10) and further comprises a signal-handler table in which the signal-handler registering section registers the respective signal handlers of the one or more tasks, the signals corresponding to the respective signal handlers and the priorities of the respective signal handlers while relating them to each other, wherein the selection executing section refers to the signal-handler table as the contents registered by the signal-handler registering section.

With this construction, since the signal-handler table in which the registration can be made by the signal-handler registering section is provided, the signal-handler registering section can perform the registration by writing the contents to be registered in the signal-handler table and the selection executing section can refer to the registered contents by referring to the signal handler table.

(12) A task scheduling method is a method for parallelly processing a plurality of tasks assigned with priorities and including one or more tasks each having one or more signal handlers assigned with priorities, comprising: a signal-handler registering step of registering the respective signal handlers of the one or more tasks, signals corresponding to the respective signal handlers and the priorities of the respective signal handlers while relating them to each other; a signal generating step of generating a signal; and a selection executing step of specifying an object signal handler as a signal handler corresponding to the generated signal and a priority thereof by referring to contents registered by the signal-handler registering step, and executing the one having a highest priority out of the plurality of tasks and the object signal handler.

With this construction, for the same reasons described for the task scheduling apparatus (1), the readiness of the signal handler in response to the signal can be improved by giving a high priority to the signal handler without hindering a degree of freedom in designing the priorities among the tasks.

(13) A task scheduling program is a program for causing a computer to function as a task scheduling apparatus for parallelly processing a plurality of tasks assigned with priorities and including one or more tasks each having one or more signal handlers assigned with priorities, the computer functioning as: a signal-handler registering means for registering the respective signal handlers of the one or more tasks, signals corresponding to the respective signal handlers and the priorities of the respective signal handlers while relating them to each other; a signal generating means for generating a signal; and a selection executing means for specifying an object signal handler as a signal handler corresponding to the generated signal and a priority thereof by referring to contents registered by the signal-handler registering means, and executing the one having a highest priority out of the plurality of tasks and the object signal handler.

With this construction, for the same reasons described for the task scheduling apparatus (1), the readiness of the signal handler in response to the signal can be improved by giving a high priority to the signal handler without hindering a degree of freedom in designing the priorities among the tasks.

(14) A certain storage medium is a computer-readable storage medium storing a task scheduling program for causing a computer to function as a task scheduling apparatus for parallelly processing a plurality of tasks assigned with priorities and including one or more tasks each having one or more signal handlers assigned with priorities, the computer functioning as: a signal-handler registering means for registering the respective signal handlers of the one or more tasks, signals corresponding to the respective signal handlers and the priorities of the respective signal handlers while relating them to each other; a signal generating means for generating a signal; and a selection executing means for specifying. an object signal handler as a signal handler corresponding to the generated signal and a priority thereof by referring to contents registered by the signal-handler registering means, and executing the one having a highest priority out of the plurality of tasks and the object signal handler.

With this construction, for the same reasons described for the task scheduling apparatus (1), the readiness of the signal handler in response to the signal can be improved by giving a high priority to the signal handler without hindering a degree of freedom in designing the priorities among the tasks.

(15) A certain transmission medium is a transmission medium holding a task scheduling program for causing a computer to function as a task scheduling apparatus for parallelly processing a plurality of tasks assigned with priorities and including one or more tasks each having one or more signal handlers assigned with priorities, the computer functioning as: a signal-handler registering means for registering the respective signal handlers of the one or more tasks, signals corresponding to the respective signal handlers and the priorities of the respective signal handlers while relating them to each other; a signal generating means for generating a signal; and a selection executing means for specifying an object signal handler as a signal handler corresponding to the generated signal and a priority thereof by referring to contents registered by the signal-handler registering means, and executing the one having a highest priority out of the plurality of tasks and the object signal handler.

With this construction, for the same reasons described for the task scheduling apparatus (1), the readiness of the signal handler in response to the signal can be improved by giving a high priority to the signal handler without hindering a degree of freedom in designing the priorities among the tasks.

The present application is based on Japanese Patent Application 2003-433106 (filed on Dec. 26, 2003), and the contents of this basic application are incorporated into the present application.

The present invention has been described in detail, but the above description is given as examples in all aspects and the present invention is not limited thereto. It is understood that unillustrated countless modifications can be made without departing from the scope of the invention.

INDUSTRIAL APPLICABILITY

The inventive task scheduling apparatus, task scheduling method, task scheduling program, storage medium and transmission medium are industrially useful because they enable the priorities of tasks to be freely designed while ensuring the readiness of signal handlers in response to a signal. Further, the task scheduling technology according to the present invention is effectively applicable to a wide range of fields provided that it is used in computing apparatuses (computers). For example, the task scheduling technology according to the present invention is applicable not only to large-sized computer units and personal computers, but also to various household apparatuses, information processing apparatuses, mobile phones, industrial apparatuses and the like.

The invention claimed is:

1. A task scheduling apparatus for parallel processing a plurality of tasks, each of the tasks being assigned a priority, and the plurality of tasks including one or more tasks each having one or more signal handlers, the one or more signal handlers each being assigned a priority, the task scheduling apparatus comprising:
a processor;
a signal-handler registering section for registering the one or more signal handlers of the one or more tasks, signals corresponding to the one or more signal handlers, and the priorities assigned to the one or more signal handlers while relating them to each other;
a signal generating section for generating a signal for designating a signal handler;

a priority table for recording the plurality of tasks and the priorities thereof while relating them to each other, wherein the plurality of tasks includes an ordinary task and a signal-handler processing task for executing at least one signal handler, the signal-handler processing task includes a queue in which at least one signal handler to be executed is registered, the signal-handler processing task includes a variable priority to be changed depending on a priority of at least one signal handler registered in the queue, and the signal-handler processing task causes to be executed a signal handler having a highest priority out of the at least one signal handler registered in the queue upon the signal-handler processing task being called and executed; and a selection executing section including
- a signal notifying section for specifying the signal handler designated by the generated signal as an object signal handler and assigning a priority to the object signal handler by referring to contents registered by the signal-handler registering section, and registering the object signal handler in the queue,
- a priority changing section for specifying the signal handler having the highest priority out of the at least one signal handler registered in the queue by referring to the contents registered by the signal-handler registering section when a signal handler registered in the queue has been changed such that content in the queue has been changed, and changing the variable priority of the signal-handler processing task recorded in the priority table to the priority of the specified highest priority signal handler,
- a selecting section for selecting a task from among the plurality of tasks corresponding to a highest priority of the plurality of priorities recorded in the priority table as an object to be executed by referring to the priority table, and
- an executing section for executing the task selected by the selecting section.

2. A task scheduling apparatus according to claim 1, wherein the signal notifying section deletes, from the priority table, recorded content relating to the task whose execution has been completed when the executing section completes the execution of the task.

3. A task scheduling apparatus according to claim 1, wherein the signal-handler processing task deletes, from the queue, registration of the highest priority signal handler whose execution has been completed when the execution of the highest priority signal handler is completed.

4. A task scheduling apparatus according to claim 1, further comprising a task registering section for registering the priorities of the one or more tasks in the priority table upon a registration instruction from the one or more tasks.

5. A task scheduling apparatus according to claim 4, wherein the task registering section changes the priorities of the one or more tasks registered in the priority table upon a change instruction from the one or more tasks.

6. A task scheduling apparatus according to claim 5, further comprising:
- a buffer for temporarily storing data outputted from a specific task, the specific task being one of the one or more tasks, and
- a buffer administering section for notifying the signal generating section when an amount of the data stored in the buffer falls below a predetermined reference amount,
wherein the specific task includes a specific signal handler for causing the task registering section to change the priority of the specific task registered in the priority table to a higher value by giving an instruction to the task registering section, and the signal generating section generates a signal corresponding to the specific signal handler upon receiving the notification from the buffer administering section.

7. A task scheduling apparatus according to claim 1, further comprising a signal-handler table in which the signal-handler registering section registers the one or more signal handlers of the one or more tasks, the signals corresponding to the one or more signal handlers, and the priorities assigned to the one or more signal handlers while relating them to each other, wherein the selection executing section refers to the signal-handler table as the contents registered by the signal-handler registering section.

8. A task scheduling method for parallel processing a plurality of tasks using a processor, each of the tasks being assigned a priority, and the plurality of tasks including one or more tasks each having one or more signal handlers, the one or more signal handlers each being assigned a priority, the task scheduling method comprising:
- a signal-handler registering step of registering the one or more signal handlers of the one or more tasks, signals corresponding to the one or more signal handlers, and the priorities assigned to the one or more signal handlers while relating them to each other;
- a signal generating step of generating a signal for designating a signal handler;
- a priority table recording step of recording, in a priority table, the plurality of tasks and the priorities thereof while relating them to each other, wherein the plurality of tasks includes an ordinary task and a signal-handler processing task for executing at least one signal handler, the signal-handler processing task includes a queue in which at least one signal handler to be executed is registered, the signal-handler processing task includes a variable priority to be changed depending on a priority of at least one signal handler registered in the queue, and the signal-handler processing task causes to be executed a signal handler having a highest priority out of the at least one signal handler registered in the queue upon the signal-handler processing task being called and executed; and
- a selection executing step including:
  - a signal notifying step of specifying the signal handler designated by the generated signal as an object signal handler and assigning a priority to the object signal handler by referring to contents registered by the signal-handler registering step, and registering the object signal handler in the queue,
  - a priority changing step of specifying the signal handler having the highest priority out of the at least one signal handler registered in the queue by referring to the contents registered by the signal-handler registering step when a signal handler registered in the queue has been changed such that content in the queue has been changed, and changing the variable priority of the signal-handler processing task recorded in the priority table to the priority of the specified highest priority signal handler,
  - a selecting step of selecting the task from among the plurality of tasks corresponding to a highest priority of the plurality of priorities recorded in the priority table as an object to be executed by referring to the priority table; and
  - an executing step of executing the task selected by the selecting step.

9. A non-transitory computer-readable storage medium storing a task scheduling program for causing a computer to perform a task scheduling method for parallel processing a plurality of tasks, each plurality of task being assigned a priority, and the plurality of tasks including one or more tasks each having one or more signal handlers, the one or more signal handlers each being assigned a priority, the task scheduling method comprising:

- a signal-handler registering step of registering the one or more signal handlers of the one or more tasks, signals corresponding to the one or more signal handlers, and the priorities assigned to the one or more signal handlers while relating them to each other;
- a signal generating step of generating a signal for designating a signal handler;
- a priority table recording step of recording, in a priority table, the plurality of tasks and the priorities thereof while relating them to each other, wherein the plurality of tasks includes an ordinary task and a signal-handler processing task for executing at least one signal handler, the signal-handler processing task includes a queue in which at least one signal handler to be executed is registered, the signal-handler processing task includes a variable priority to be changed depending on a priority of at least one signal handler registered in the queue, and the signal-handler processing task causes to be executed a signal handler having a highest priority out of the at least one signal handler registered in the queue upon the signal-handler processing task being called and executed; and
- a selection executing step including
  - a signal notifying step of specifying the signal handler designated by the generated signal as an object signal handler and assigning a priority to the object signal handler by referring to contents registered by the signal-handler registering step, and registering the object signal handler in the queue,
  - a priority changing step of specifying the signal handler having the highest priority out of the at least one signal handler registered in the queue by referring to the contents registered by the signal-handler registering step when a signal handler registered in the queue has been changed such that content in the queue has been changed, and changing the variable priority of the signal-handler processing task recorded in the priority table to the priority of the specified highest priority signal handler,
  - a selecting step of selecting a task from among the plurality of tasks corresponding to a highest priority of the plurality of priorities recorded in the priority table as an object to be executed by referring to the priority table, and
  - an executing step executing the task selected by the selecting step.

* * * * *